United States Patent
Kim

(10) Patent No.: US 11,160,053 B2
(45) Date of Patent: Oct. 26, 2021

(54) METHOD AND APPARATUS FOR TRANSMITTING AND RECEIVING SIDELINK DATA

(71) Applicant: KT CORPORATION, Gyeonggi-do (KR)

(72) Inventor: Ki-tae Kim, Seoul (KR)

(73) Assignee: KT CORPORATION, Seongnam-si (KR)

( * ) Notice: Subject to any disclaimer, the term of this patent is extended or adjusted under 35 U.S.C. 154(b) by 5 days.

(21) Appl. No.: 16/729,138

(22) Filed: Dec. 27, 2019

(65) Prior Publication Data

US 2020/0275412 A1  Aug. 27, 2020

(30) Foreign Application Priority Data

Feb. 22, 2019 (KR) .................. 10-2019-0021413
Jul. 29, 2019 (KR) .................. 10-2019-0091435

(51) Int. Cl.
*H04W 72/04* (2009.01)
*H04W 72/02* (2009.01)
*H04L 1/18* (2006.01)
*H04B 7/0456* (2017.01)
*H04B 7/06* (2006.01)
*H04L 1/00* (2006.01)
*H04W 92/18* (2009.01)

(52) U.S. Cl.
CPC .......... *H04W 72/02* (2013.01); *H04B 7/0486* (2013.01); *H04B 7/0632* (2013.01); *H04B 7/0639* (2013.01); *H04L 1/0003* (2013.01); *H04L 1/1819* (2013.01); *H04W 72/0406* (2013.01); *H04W 92/18* (2013.01)

(58) Field of Classification Search
CPC .. H04B 7/0456; H04B 7/0486; H04B 7/0632; H04B 7/0639; H04L 1/0003; H04L 1/0025; H04L 1/1812; H04L 1/1819; H04L 1/1887; H04L 2001/0092; H04L 5/0044; H04L 5/0091; H04W 72/02; H04W 72/0406; H04W 92/18
See application file for complete search history.

(56) References Cited

U.S. PATENT DOCUMENTS

| 2019/0124634 A1* | 4/2019 | Li | H04W 72/0446 |
| 2020/0112982 A1* | 4/2020 | Li | H04L 5/0082 |
| 2020/0195389 A1* | 6/2020 | Basu Mallick | H04L 1/08 |
| 2020/0221271 A1* | 7/2020 | Kim | H04W 72/0446 |

* cited by examiner

Primary Examiner — Phuc H Tran
(74) Attorney, Agent, or Firm — Invenstone Patent, LLC

(57) ABSTRACT

Provided are methods and apparatuses for transmitting/receiving sidelink data. The method of a transmitter UE for transmitting sidelink data includes transmitting a radio resource allocation request message for requesting the allocation of a radio resource used for sidelink data transmission, receiving first radio resource information used for the sidelink data transmission and second radio resource information for sidelink data retransmission, transmitting sidelink data based on the first radio resource information, and when retransmission is triggered according to the reception of hybrid automatic repeat request (HARQ) feedback information on sidelink data, retransmitting the sidelink data based on the second radio resource information.

12 Claims, 19 Drawing Sheets

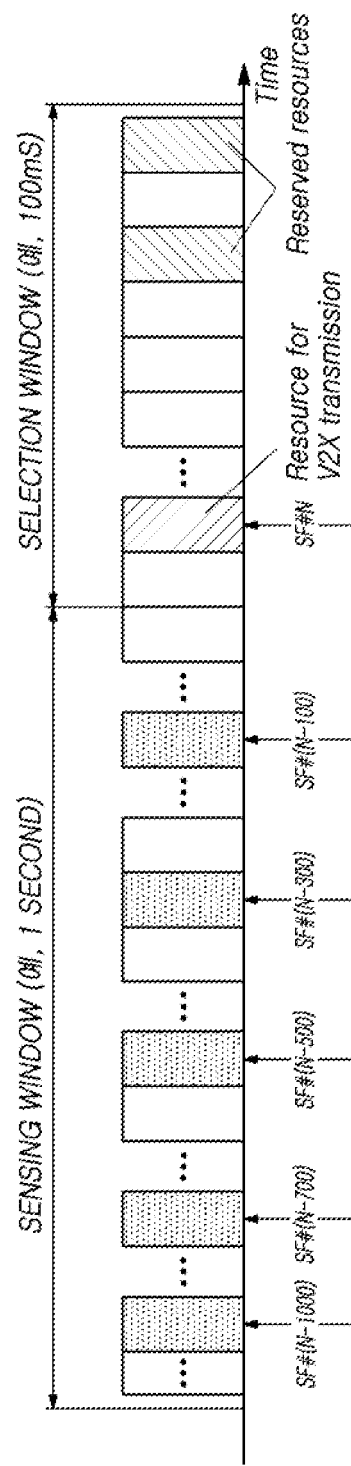

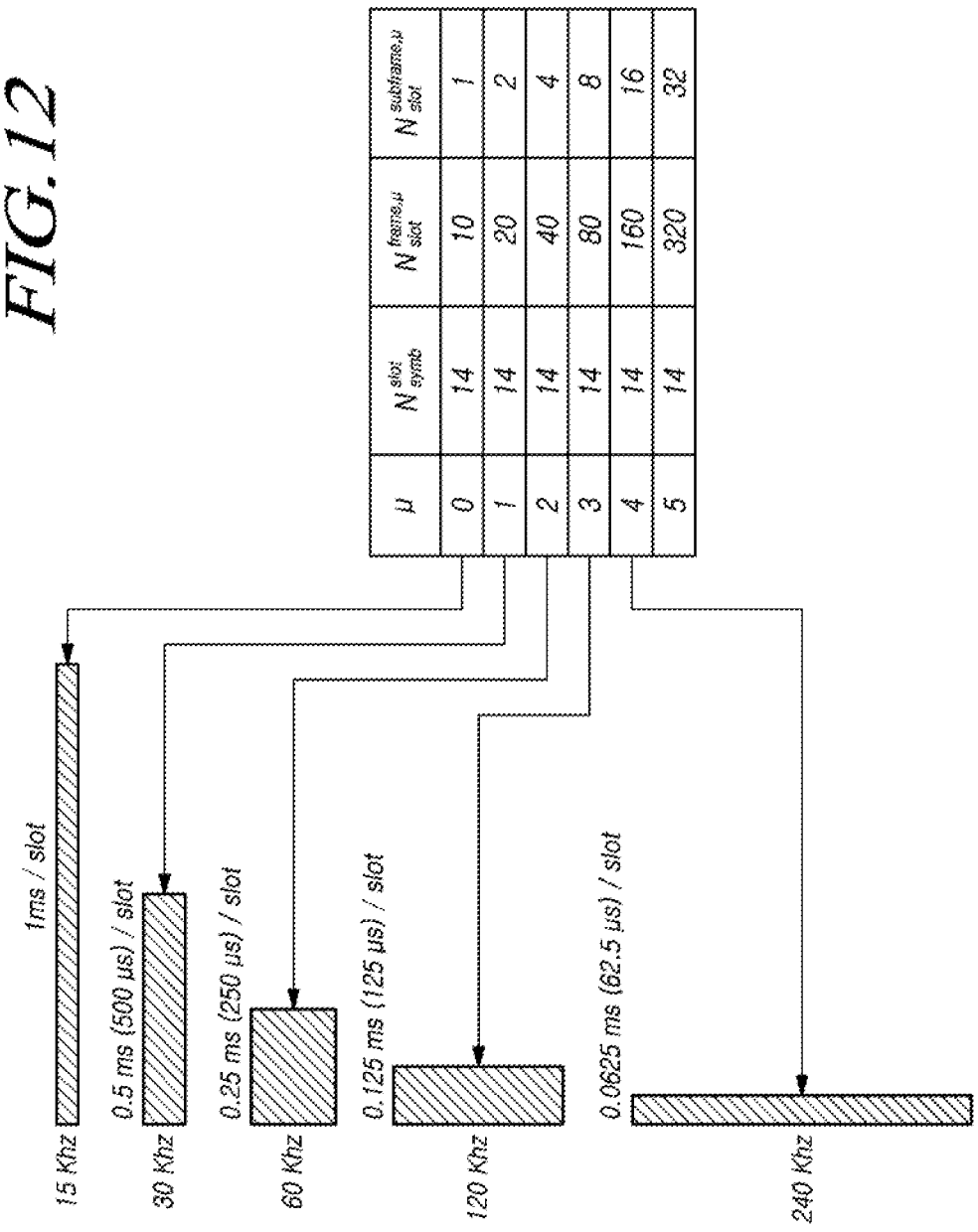

METHOD AND APPARATUS FOR TRANSMITTING AND RECEIVING SIDELINK DATA

CROSS-REFERENCE TO RELATED APPLICATION

This application claims the priority benefit of Korean Patent Application No. 10-2019-0021413, filed on Feb. 22, 2019 and No. 10-2019-0091435, filed on Jul. 29, 2019 in the Korean Intellectual Property Office, the disclosures of which are incorporated herein by reference in their entirety.

BACKGROUND

1. Technical Field

The present disclosure relates to methods and apparatuses for transmitting and receiving sidelink data in a next-generation/5G radio access network (hereinafter, referred to as a new radio, "NR").

2. Description of the Related Art

Recently, the 3rd generation partnership project (3GPP) has approved the "Study on New Radio Access Technology", which is a study item for research on next-generation/5G radio access technology (hereinafter, referred to as "new radio" or "NR"). On the basis of the Study on New Radio Access Technology, Radio Access Network Working Group 1 (RAN WG1) has been discussing frame structures, channel coding and modulation, waveforms, multiple access methods, and the like for the new radio (NR). It is required to design the NR not only to provide an improved data transmission rate as compared with the long term evolution (LTE)/LTE-Advanced, but also to meet various requirements in detailed and specific usage scenarios.

An enhanced mobile broadband (eMBB), massive machine-type communication (mMTC), and ultra reliable and low latency communication (URLLC) are proposed as representative usage scenarios of the NR. In order to meet the requirements of the individual scenarios, it is required to design the NR to have flexible frame structures, compared with the LTE/LTE-Advanced.

Because the requirements for data rates, latency, reliability, coverage, etc. are different from each other, there is a need for a method for efficiently multiplexing a radio resource unit based on different numerologies from other (e.g., subcarrier spacing, subframe, Transmission Time Interval (TTI), etc.) as a method for efficiently satisfying each usage scenario requirement through a frequency band constituting any NR system.

As an aspect of developing such items, there is a need for a design for transmitting and receiving sidelink data over a sidelink that is a radio link between user devices (hereinafter, referred to as "user equipment" or "UE") for providing a V2X service in the NR, i.e. a NR sidelink.

SUMMARY

It is at least one object of present disclosure to provide methods and apparatuses for supporting a resource reservation for radio resources used for the retransmission of sidelink data based on hybrid automatic repeat request (HARQ) feedback information.

In accordance with one aspect of the present disclosure, a method of a transmitter user equipment (UE) is provided for transmitting sidelink data. The method may include: transmitting a radio resource allocation request message for requesting the allocation of a radio resource used for sidelink data transmission, receiving first radio resource information used for the sidelink data transmission and second radio resource information for sidelink data retransmission, transmitting sidelink data based on the first radio resource information, and when retransmission is triggered according to the reception of hybrid automatic repeat request (HARQ) feedback information for sidelink data, retransmitting the sidelink data based on the second radio resource information.

In accordance with another aspect of the present disclosure, a method of a receiver user equipment (UE) is provided for receiving sidelink data. The method may include: receiving, from a transmitter UE, control information including scheduling information on a first radio resource used for sidelink data transmission and a second radio resource reserved for sidelink data retransmission, monitoring sidelink data over the first radio resource indicated by the control information, transmitting hybrid automatic repeat request (HARQ) feedback information to the transmitter UE when the sidelink data are not received, and monitoring the sidelink data that the transmitter UE has retransmitted over the reserved second radio resource according to the HARQ feedback information.

In accordance with further another aspect of the present disclosure, a transmitter user equipment (UE) is provided for transmitting sidelink data. The transmitter UE may include including: a transmitter transmitting a radio resource allocation request message for requesting the allocation of a radio resource used for sidelink data transmission, and a receiver receiving first radio resource information used for the sidelink data transmission and second radio resource information for sidelink data retransmission, the transmitter transmitting sidelink data based on the first radio resource information, and when retransmission is triggered according to the reception of hybrid automatic repeat request (HARQ) feedback information for the sidelink data, retransmitting the sidelink data based on the second radio resource information.

In accordance with yet another aspect of the present disclosure, a receiver user equipment (UE) is provided for receiving sidelink data. The receiver UE may include: a receiver configured to receive, from a transmitter UE, control information including scheduling information on a first radio resource used for sidelink data transmission and a second radio resource reserved for sidelink data retransmission, a controller configured to monitor sidelink data over the first radio resource indicated, a transmitter configured to transmit hybrid automatic repeat request (HARQ) feedback information to the transmitter UE when the sidelink data are not received, the receiver monitoring the sidelink data that the transmitter UE has retransmitted over the reserved second radio resource according to the HARQ feedback information.

In accordance with embodiments of the present disclosure, it is possible to provide methods and apparatuses for rapidly retransmitting sidelink data by supporting a resource reservation for radio resources used for the retransmission of the sidelink data based on HARQ feedback information.

BRIEF DESCRIPTION OF THE DRAWINGS

The above and other aspects, features, and advantages of the present disclosure will be more apparent from the following detailed description taken in conjunction with the accompanying drawings.

FIGS. 11A and 11B are illustrates a type of a V2X transmission resource pool.

FIG. 12 is a view illustrating an example of symbol level alignment among different subcarrier spacings (SCSs) in accordance with embodiments of the present disclosure.

DETAILED DESCRIPTION

Figure 1:
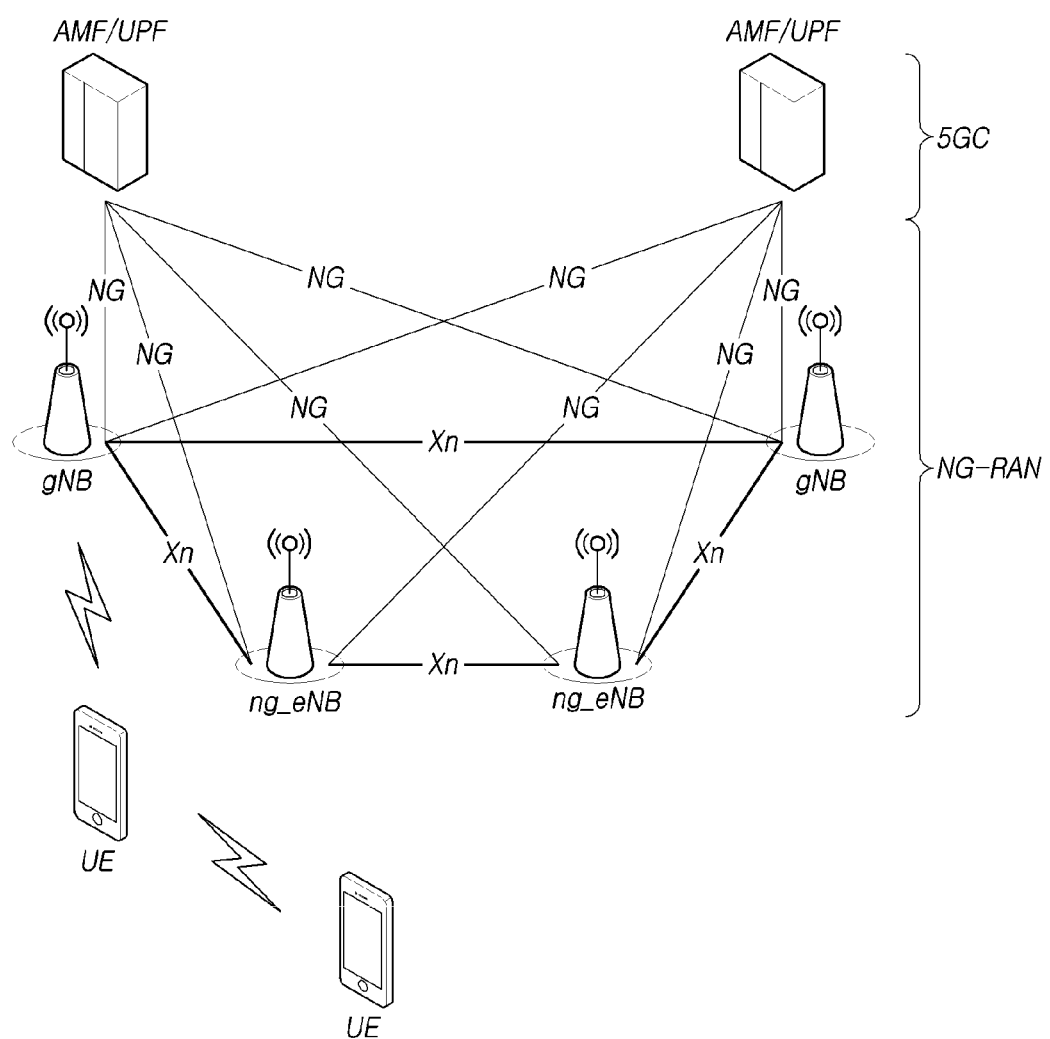
FIG. 1 is a view schematically illustrating an NR wireless communication system in accordance with embodiments of the present disclosure.

Hereinafter, some embodiments of the present disclosure will be described in detail with reference to the accompanying illustrative drawings. In the drawings, like reference numerals are used to denote like elements throughout the drawings, even if they are shown on different drawings. Further, in the following description of the present disclosure, a detailed description of known functions and configurations incorporated herein will be omitted when it may make the subject matter of the present disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (A), (B) or the like may be used herein when describing components of the present disclosure. Each of these terminologies is not used to define an essence, order or sequence of a corresponding component but used merely to distinguish the corresponding component from other component(s).

In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression.

Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as 3GPP, 3GPP2, WiFi, Bluetooth, IEEE, ITU, or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized, and may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or may be a vehicle, a device including a wireless communication module in the vehicle, and the like in a V2X communication system according to the usage type thereof. In the case of a machine-type communication (MTC) system, the UE may refer to an MTC terminal, an M2M terminal, or a URLLC terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or the base station may be 2) a wireless region itself. In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from the other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to a scheme of transmitting data from a UE to a base station, and a downlink (DL) refers to a scheme of transmitting data from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information over a control channel, such as a physical downlink control channel (PDCCH) and a physical uplink control channel (PUCCH). The uplink and downlink transmit and receive data over a data channel such as a physical downlink shared channel (PDSCH) and a physical uplink shared channel (PUSCH). Hereinafter, the transmission and reception of a signal over a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

The 3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology. Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR introduces a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

<Overview of NR System>

FIG. 1 is a view schematically illustrating an NR system to which the present embodiment is applicable.

Referring to FIG. 1, the NR system is divided into a 5G core network (5GC) and an NG-RAN part. The NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1: FR1) and frequency bands equal to or greater than 6 GHz (frequency range 2: FR2).

The gNB denotes a base station that provides a UE with an NR user plane and control plane protocol end. The ng-eNB denotes a base station that provides a UE with an E-UTRA user plane and control plane protocol end. The base station described in the present specification should be understood as encompassing the gNB and the ng-eNB.

However, the base station may be also used to refer to the gNB or the ng-eNB separately from each other, as necessary.

<NR Waveform, Numerology, and Frame Structure>

NR uses a CP-OFDM waveform using a cyclic prefix for downlink transmission and uses CP-OFDM or DFT-s-OFDM for uplink transmission. OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario over frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP). As shown in Table 1 below, "$\mu$" is used as an exponential value of 2 to be changed exponentially on the basis of 15 kHz.

TABLE 1

| $\mu$ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Figure 2:
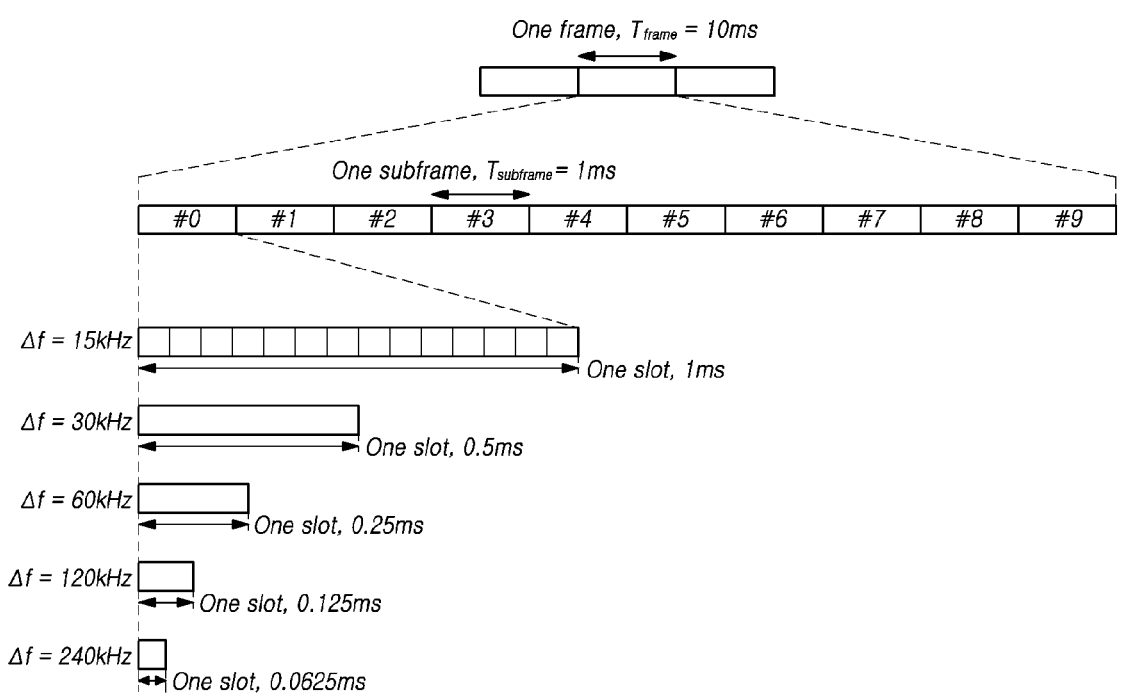
FIG. 2 is a view schematically illustrating a frame structure in an NR system in accordance with embodiments of the present disclosure.

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 kHz. A frame that includes 10 subframes each having the same length of 1 ms and has a length of 10 ms is defined in the frame structure in NR. One frame may be divided into half frames of 5 ms, and each half frame includes 5 subframes. In the case of a subcarrier spacing of 15 kHz, one subframe includes one slot, and each slot includes 14 OFDM symbols. FIG. 2 is a view for explaining a frame structure in an NR system to which the present embodiment may be applied.

Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot includes 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource allocation as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by instructing, using the SFI, the index of a table configured through UE-specific RRC signaling. Further, the base station may dynamically instruct the slot format using downlink control information (DCI) or may statically or quasi-statically instruct the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port can be inferred from the other channel carrying a symbol on another antenna port, the two antenna ports may have a quasi-co-located or quasi-co-location (QC/QCL) relationship. The large-scale properties include at least one of delay spread, Doppler spread, a frequency shift, an average received power, and a received timing.

Figure 3:
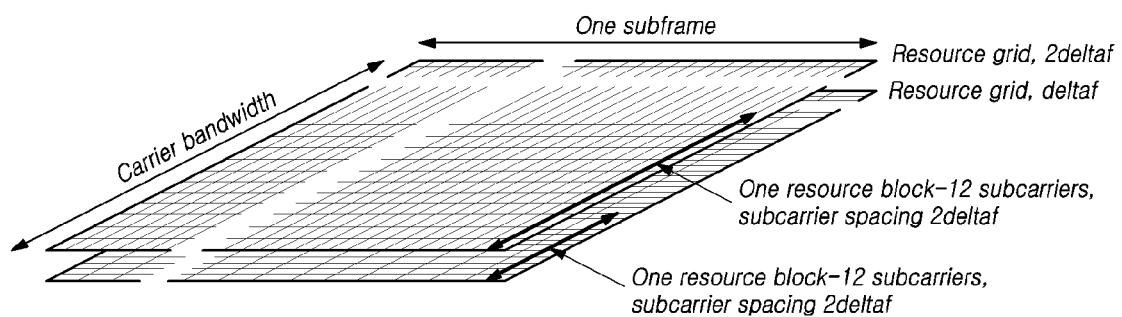
FIG. 3 is a view for explaining resource grids supported by a radio access technology in accordance with embodiments of the present disclosure.

FIG. 3 is a view for explaining resource grids supported by a radio access technology to which the present embodiment is applicable.

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
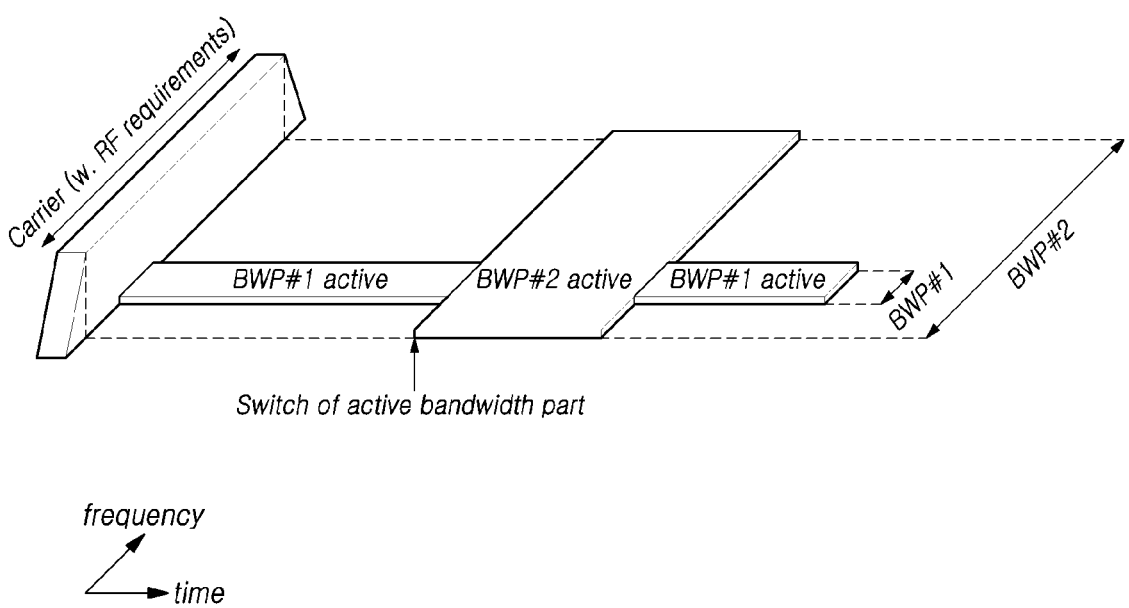
FIG. 4 is a view for explaining bandwidth parts supported by a radio access technology in accordance with embodiments of the present disclosure.

FIG. 4 is a view for explaining bandwidth parts supported by a radio access technology to which the present embodiment is applicable.

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink. The UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
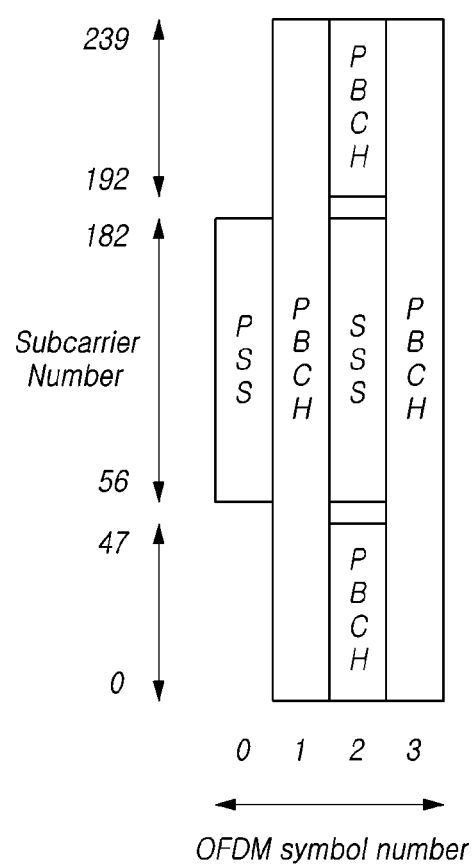
FIG. 5 is a view illustrating an example of a synchronization signal block in a radio access technology in accordance with embodiments of the present disclosure.

FIG. 5 is a view illustrating an example of a synchronization signal block in a radio access technology to which the present embodiment is applicable.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that may be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB over the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted over a PDSCH. In order to receive SIB1, the UE must receive numerology information used for the SIB1 transmission and the CORESET (control resource set) information used for scheduling of SIB1 over a PBCH. The UE identifies scheduling information for SIB1 using SI-RNTI in the CORESET. The UE acquires SIB1 on the PDSCH according to scheduling information. The remaining SIBs other than SIB1 may be periodically transmitted, or the remaining SIBs may be transmitted according to the request of the UE.

Figure 6:
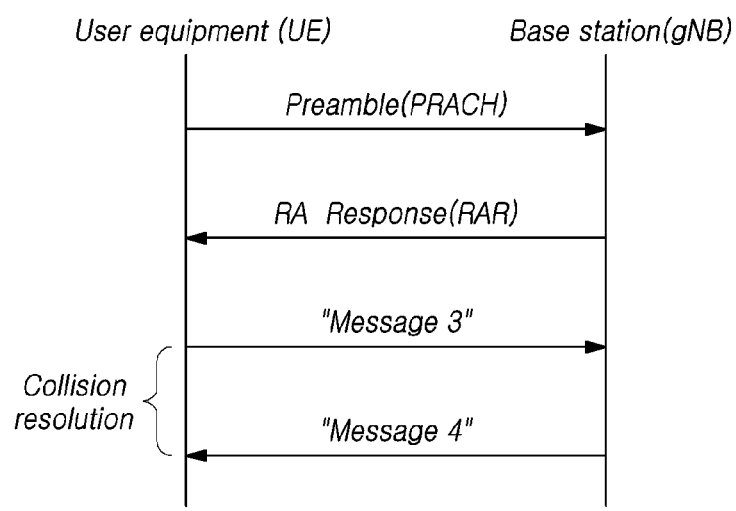
FIG. 6 is a signal diagram for explaining a random access procedure in a radio access technology in accordance with embodiments of the present disclosure.

FIG. 6 is a view for explaining a random access procedure in a radio access technology to which the present embodiment is applicable.

Referring to FIG. 6, if a cell search is completed, the UE transmits a random access preamble for random access to the base station. The random access preamble is transmitted over a PRACH. Specifically, the random access preamble is periodically transmitted to the base station over the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

<NR CORESET>

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
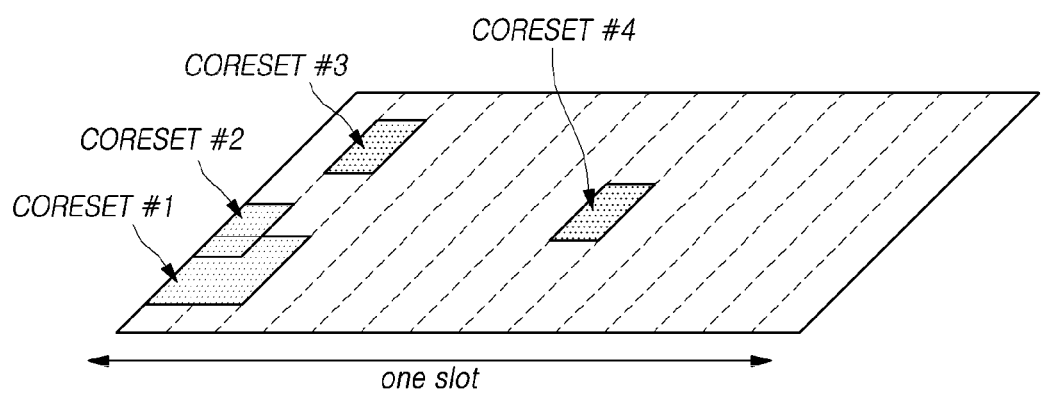
FIG. 7 is a view for explaining CORESET.

FIG. 7 is a view for explaining CORESETs.

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., instructed, assigned) by an MIB in order to receive additional configuration information and system information from a network. After establishing a connection with the base station, the UE may receive and configure one or more pieces of CORESET information through RRC signaling.

<LTE Sidelink>

In the LTE system, for providing device-to-device communication and vehicle-to-everything (V2X) (in particular, vehicle-to-vehicle (V2V)) service, designs for a radio channel and a radio protocol for direct communication (i.e. sidelink) between devices have been developed.

With respect to the sidelink, a synchronization signal (PSSS/SSSS) for synchronizing between a radio sidelink transmission end and a radio sidelink reception end, and a physical sidelink broadcasting channel (PSBCH) for transmitting/receiving a sidelink master information block (MIB) related to this have been defined. Further, designs have been conducted on a physical sidelink discovery channel (PSDCH) for transmitting/receiving discovery information, a physical sidelink control channel (PSCCH) for transmitting/receiving sidelink control information (SCI), and a physical sidelink shared channel (PSSCH) for transmitting/receiving sidelink data.

In order to allocate a radio resource for the sidelink, two modes have been developed, i.e. i) mode 1 in which a base station allocates a radio resource and ii) mode 2 in which a UE selects and allocates a radio resource from a radio resource pool. Further, in order to satisfy the V2X scenario in the LTE system, a related technology has been required to be developed additionally.

In such an environment, the 3GPP have derived 27 service scenarios related to vehicle recognition/detection in Rel-14, and determined key performance requirements according to road conditions. In addition, the 3GPP have derived 25 service scenarios, such as vehicle platooning, advanced driving, remote driving, an extended sensor, or the like, evolved from Rel-14, and determined 6 performance requirements in Rel-15.

In order to satisfy such performance requirements, developments have been conducted for improving the performance of the sidelink technology developed based on the typical D2D communication to meet requirements of the V2X. In particular, in order to apply to the C-V2X (Cellular-V2X), a technology for improving a design of the physical layer of the sidelink to be adapted to a high-speed environment, a resource allocation technology, a synchronization technology may be selected as further study items.

The sidelink described below means a link used in D2D communication after Rel-12 of the 3GPP and V2X communication after Rel-14. The terms for each channel, synchronization signal, and resource are described using equal terms without differently being defined according to requirements of the D2D communication, requirements of the V2X communication in Rel-14 and Rel-15. This is for convenience of description and ease of understanding, and when needed, discussions will be conducted by focusing on a difference of the sidelink satisfying V2X scenario requirements relative to the sidelink for the D2D communication in Rel-12/13. Accordingly, the terms related to the sidelink discussed below are classified into D2D communication, V2X communication, and C-V2X communication for merely comparison between them and ease of understanding; therefore, such terms are not limited to a specific scenario.

<Resource Allocation>

Figure 8:
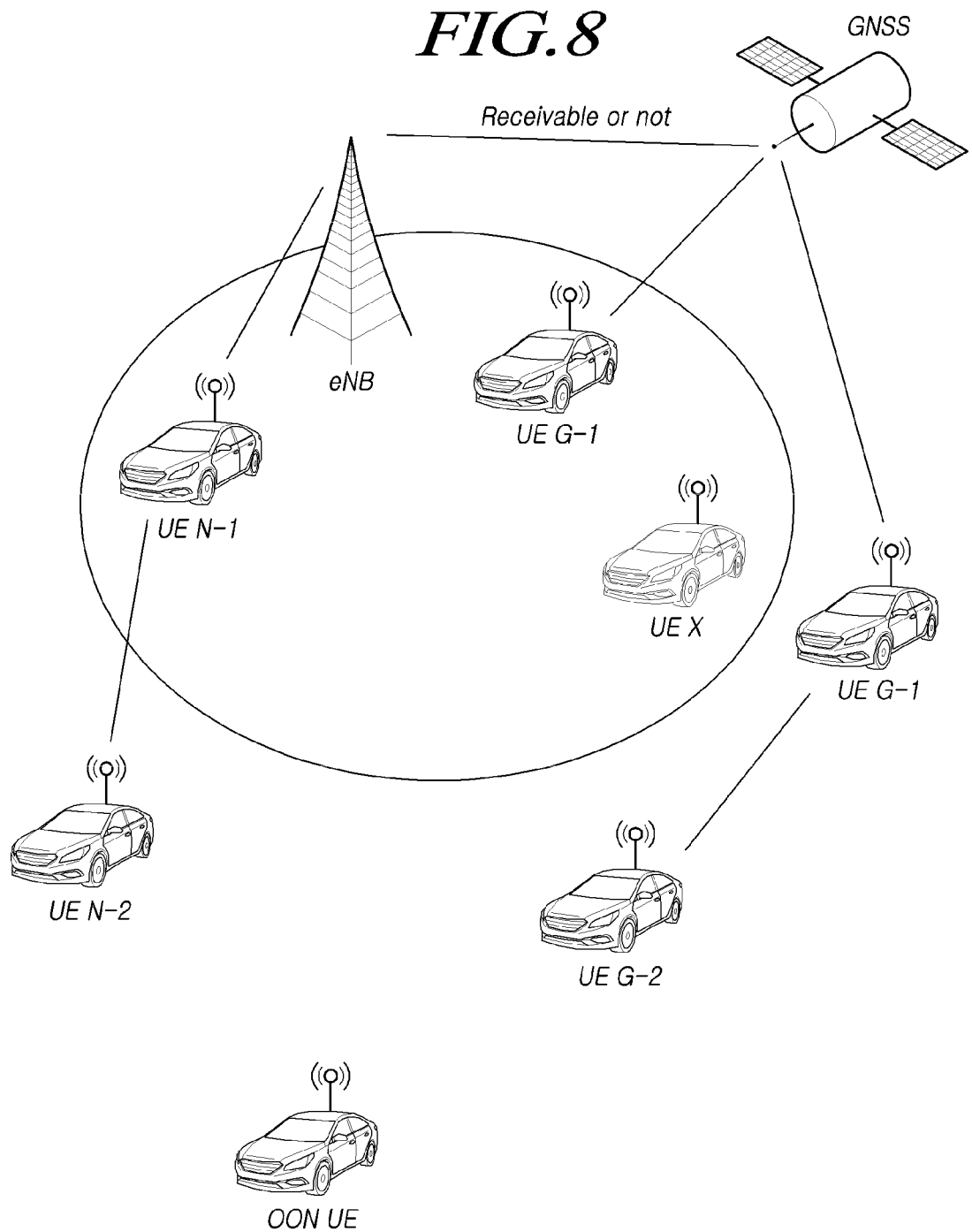
FIG. 8 is a view for explaining various scenarios for V2X communication.

FIG. 8 is a view for explaining various scenarios for V2X communication.

Referring to FIG. 8, a V2X device (represented to a vehicle; however, may be replaced with other devices, such as a user equipment (UE), etc.) may be located in coverage of a base station (an eNB, a gNB, or an ng-eNB), or located outside of coverage of the base station. For example, communication may be performed between UEs (e.g., UE N-1, UE G-1, UE X) in coverage of the base station, or communication may be performed between a UE in coverage of the base station and a UE (e.g., UE N-1, UE N-2) outside of coverage of the base station. Alternatively, communication may be performed between UEs (e.g., UE G-1, UE G-2) out of coverage of the base station.

In such various scenarios, it is necessary to allocate a radio resource for enabling a corresponding UE to perform communication using the sidelink. The allocation of the radio resource includes a method of a base station for handling the allocation of the radio resource and a method of a UE for selecting and allocating the radio resource.

Specifically, in the D2D, for enabling a UE to allocate a resource, two modes are defined, that is, i) a centralized mode (mode 1) in which a base station intervenes in the selection and management of the resource, and ii) a distributed mode (mode 2) in which a UE selects randomly one or more of pre-configured resources. Similar to the D2D, other modes are defined, such as, iii) a third mode (mode 3) in which a base station intervenes in the selection and management of the resource in the C-V2X, and iv) a fourth mode (mode 4) in which a vehicle directly selects a resource in the V2X. In the third mode (mode 3), a base station provides a schedule of a scheduling assignment (SA) pool resource area and a data pool resource area allocated to this to a transmitter UE.

Figure 9A:
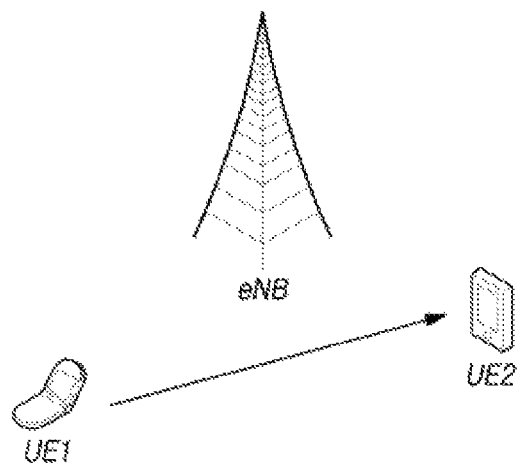
FIG. 9A is a view illustrating a first UE (UE1) and a second UE (UE2) performing sidelink communication.
Figure 9B:
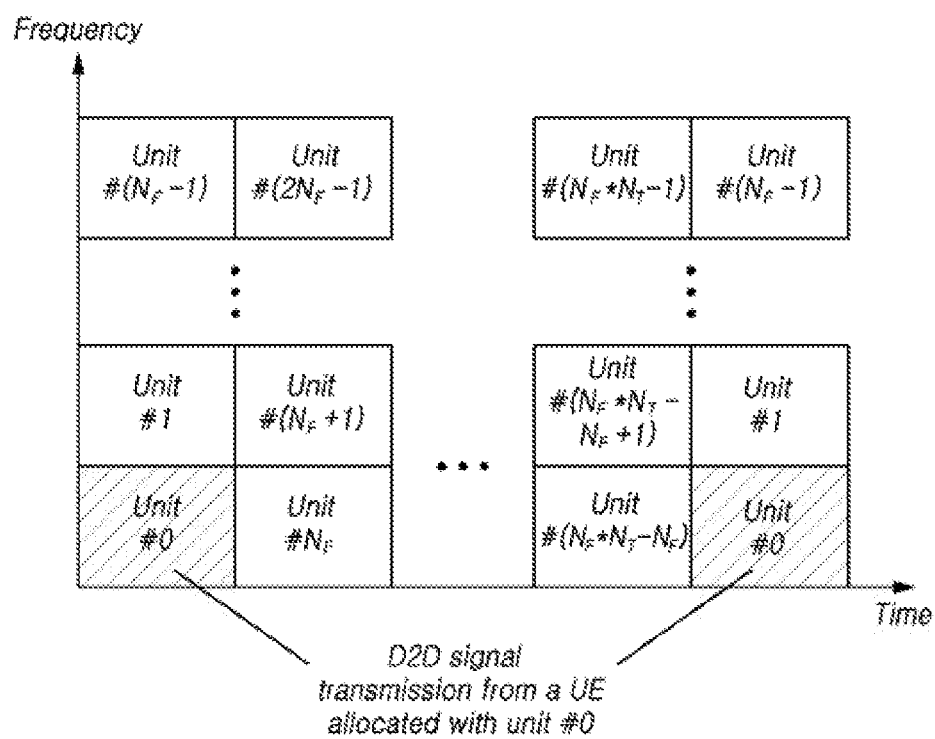
FIG. 9B is a view illustrating an example of resource pools for UEs.

FIG. 9A illustrates a first UE (UE 1) and a second UE (UE 2) performing sidelink communication, and FIG. 9B illustrates an example of resource pools used by the UEs.

Referring to FIG. 9A, a base station is represented as an eNB; however, may be a gNB or an ng-eNB as described above. Further, the UEs are represented as mobile terminals; however, vehicles, infrastructures, or the like may be applied variously depending on scenarios or situations.

In FIG. 9A, the transmitter UE (UE 1) may select a resource unit corresponding to a specific resource within a resource pool including a set of resources, and transmit a sidelink signal using the resource unit. The receiver UE (UE 2) may be configured with a resource pool over which the UE 1 is allowed to transmit a signal, and detect a transmission signal from the UE 1.

If the UE 1 is in coverage of the base station, that is, available to receive services or signals from the base station, the base station may provide the resource pool to the UE 1. If the UE 1 is out of coverage of the base station, that is, unavailable to receive services or signals from the base station, the resource pool may be determined as one or more resources which are pre-configured or provided by another UE. Normally, the resource pool is made up of a plurality of resource units, and each UE may select one or more resource units and use the selected resource unit(s) for transmitting a sidelink signal.

Referring to FIG. 9B, the entire frequency resource is divided into NF frequency resources, and the entire time resource is divided into NT time resources. Thus, a total of NF*NT resource units can be defined. In this case, it is possible to express that a corresponding resource pool is repeated at a period of NT subframes. In particular, one resource unit may be configured to be provided periodically and repeatedly, as illustrated in FIG. 9B.

The resource pool may be classified into several types according to a certain criterion. For example, the resource pool may be classified into several types according to contents of a sidelink signal transmitted over each resource pool. As one example, the contents of the sidelink signal may be classified, and a separate resource pool may be configured for each of the contents. Scheduling assignment (SA), a sidelink channel, a discovery channel, or the like may be examples of the contents of the sidelink signal.

The SA may be a signal including information, such as, a location of a resource used to transmit a subsequent sidelink data channel by a transmitter UE, a modulation and coding scheme (MCS) that is needed to demodulate a data channel, a MIMO transmission scheme, timing advance (TA), or the like. This signal may be transmitted by being multiplexed with sidelink data over an identical resource unit as well. In this case, the SA resource pool may mean a pool of resources over which the SA is transmitted by being multiplexed with the sidelink data.

An FDM scheme applied to the V2X communication may lead a time delay until a data resource is allocated after a SA resource has been allocated to be reduced. For example, it is possible to consider a non-adjacent scheme in which a control channel resource and a data channel resource are split in time domain in one subframe, an adjacent scheme in which a control channel and a data channel are consecutively allocated in one subframe, or the like.

When the sidelink data along with the SA are multiplexed and transmitted over an identical resource unit, a sidelink data channel only in a different form from SA information may be transmitted over a resource pool for the sidelink data channel. In other words, resource elements used to transmit SA information over one or more individual resource units within a SA resource pool may be used still for transmitting sidelink data in a sidelink data channel resource pool. The discovery channel may be a resource pool for a message for enabling a transmitter UE to transmit information, such as an ID of the transmitter UE, or the like, and a neighboring UE to discover the transmitter UE. Even when contents of the sidelink signal are equal, different resource pools may be used according to transmission and/or reception characteristics of the sidelink signal.

For example, in even the case of an identical sidelink data channel or a discovery message, a different resource pool may be used according to a method of determining a transmission timing of a sidelink signal (e.g., whether the sidelink signal is transmitted at the time of receiving a synchronization reference signal or transmitted by applying a certain TA from the time of receiving the synchronization reference signal) or a method of allocating a resource (e.g., whether a base station dedicates a resource for transmitting a signal to a transmitter UE or whether a transmitter UE on its own selects a resource for transmitting a signal in a pool), a signal format (e.g., the number of symbols occupied by each sidelink signal in one subframe, the number of subframes used for transmitting one sidelink signal), a signal strength of from a base station, a transmission power strength of a sidelink UE, or the like.

<Synchronization Signal>

As described above, a V2X communication UE may be located out of coverage of a base station. In even this situation, it is necessary for communication using the sidelink to be performed. To do this, it is important for a UE located out of coverage of the base station to achieve synchronization.

Hereinafter, a method of achieving time and frequency synchronization in sidelink communication, particularly in communication between vehicles, between a vehicle and a UE, or between a vehicle and a communication network will be described based on the description above.

The D2D communication utilizes a sidelink synchronization signal (SLSS), which is a synchronization signal transmitted from a base station for time synchronization between UEs. In the C-V2X, a satellite system (the Global Navigation Satellite System (GNSS)) may be additionally considered for enhancing synchronization performance. In this case, priority may be given to synchronization establishment or a base station may indicate information on priority. For example, when determining its transmission synchronization, a UE selects a synchronization signal directly transmitted from a base station as a highest priority. When the UE is out of coverage of the base station, synchronizes with the SLSS transmitted from another UE in coverage of the base station as a higher priority.

Since a wireless terminal (hereinafter, for convenience of description, may be referred to as the UE as well) installed in a vehicle, or a UE mounted in the vehicle has a less problem with battery consumption and can use a satellite signal such as the GPS for navigation purposes, the satellite signal may be used for configuring time or frequency synchronization between UEs. The satellite signal may include, as well as the Global Positioning System (GPS), the GLObal NAvigation Satellite System (GLONAS), GALILEO, BEIDOU, or the like.

The sidelink synchronization signal may include a primary sidelink synchronization signal (PSSS), a secondary sidelink synchronization signal (SSSS), or the like. The PSSS may include a Zadoff-chu sequence with a pre-configured length, a structure similar to the PSS, a structure changed from the PSS, or a structure in which the PSS is repeated. Unlike a DL PSS, a different Zadoff-chu root index (e.g. 26, 37) may be used. The SSSS may include an M-sequence, a structure similar to the SSS, a structure changed from the SSS, or a structure in which the SSS is repeated. In a situation where UEs synchronize with a base station, the SRN is served as the base station, and the SLSS is served as the PSS or the SSS.

Unlike the PSS/SSS of DL, the PSSS/SSSS uses an UL subcarrier mapping method. A physical sidelink synchronization channel (PSSCH) may be a channel for transmitting system information (e.g., information related to the SLSS, a duplex mode (DM), a TDD UL/DL configuration, information related to a resource pool, types of applications related to the SLSS, a subframe offset, broadcast information, or the like) which is basic information that the UE is required to identify first before transmitting/receiving a sidelink signal. The PSSCH may be transmitted over a subframe identical or subsequent to the SLSS. The DM-RS may be used for demodulation of the PSSCH.

The SRN may be a node for transmitting the SLSS or the PSSCH. The SLSS may be in the form of a specific sequence, and the PSSCH may be a sequence representing specific information or in the form of a codeword after pre-defined channel coding has been performed. Here, a base station or a specific sidelink UE may be served as the SRN. A UE may be served as the SRN in the case of partial network coverage or out-of-network-coverage.

When needed, the SLSS may be relayed, for example, by multi-hop, for sidelink communication with an out-of-coverage UE. Relaying a synchronization signal in description below includes, as well as directly relaying a synchronization signal of a base station, transmitting a sidelink synchronization signal in a separate format at the time of receiving the synchronization signal. Like this, since the sidelink synchronization signal is relayed, direct communication between an in-coverage UE and an out-of-coverage UE may be performed.

<NR Sidelink>

As described above, unlike the V2X based on the LTE system, NR-based V2X technology is required to be developed for satisfying complex requirements as in autonomous driving.

In accordance with embodiments of the present disclosure, it is possible to provide a flexible V2X service in more diverse environments by applying a frame structure, numerology, a channel transmission/reception procedure, or the like of the NR to the NR V2X. To this end, it is necessary to develop technologies, such as, a resource sharing technology between a base station and a UE, a sidelink carrier aggregation technology (CA), a partial sensing technology for a UE held by a pedestrian, a short transmission time interval (sTTI), or the like.

In the NR V2X, it has been determined to support unicast or groupcast, as well as broadcast used in the LTE V2X. In this case, it also has been determined to use a target group ID for the unicast or the groupcast, and but it has been determined to discuss later whether to use a source ID.

Further, as it has been determined to support HARQ for QOS, it has been determined that a HARQ process ID is included in control information. In the LTE HARQ, a PUCCH for the HARQ is transmitted after 4 subframes after DL has been transmitted. In the NR HARQ, for feedback timing, a PUCCH resource and a feedback timing may be indicated using a PUCCH resource indicator in DCI format 1_0 or 1_1 PUCCH or a HARQ feedback timing indicator in response to the PDSCH (PDSCH-to-HARQ feedback timing indicator).

Figure 10:
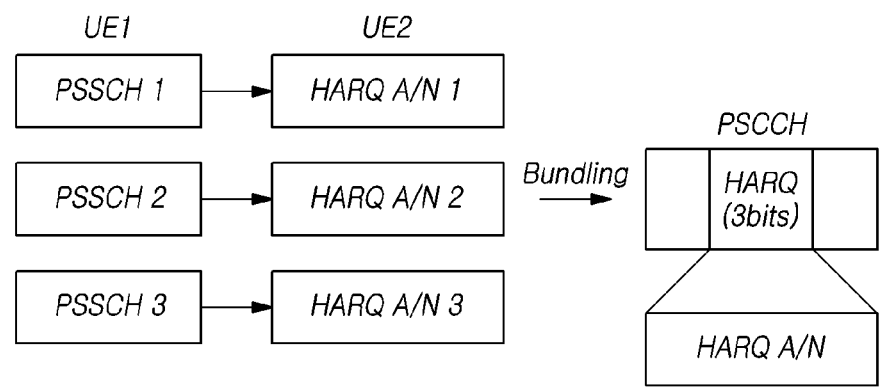
FIG. 10 is a view for explaining a method of bundling and transmitting HARQ feedback information in the V2X.

FIG. 10 is a view for explaining a method of bundling and transmitting HARQ feedback information in the V2X.

Referring to FIG. 10, in the LTE V2X, separate HARQ ACK/NACK information is not transmitted in order to reduce system overhead, and data are allowed to be retransmitted once according to discretion of a transmitter UE for data transmission safety. However, in the NR V2X, in terms of data transmission stability, HARQ ACK/NACK information may be transmitted. In this case, overhead can be reduced by bundling and transmitting the corresponding information.

That is, when a transmitter UE UE1 transmits three data transmissions to a receiver UE UE2, and then the receiver UE generates HARQ ACK/NACK information in response to the transmissions, this may be bundled and transmitted over a PSCCH. FIG. 10 illustrates that HARQ ACK/NACK is transmitted over the PSCCH. However, the HARQ ACK/NACK may be transmitted over a separate channel or another channel, and the bundled HARQ information may be configured with 3 bits or less.

In frequency range 1 (FR1) for a frequency range of 3 GHz or less, 15 kHz, 30 kHz, 60 kHz, and 120 kHz have been discussed as a candidate subcarrier spacing (SCS). In frequency range 2 (FR2) for a frequency range exceeding 3 GHz, 30 kHz, 60 kHz, 120 kHz, and 240 kHz have been discussed as a candidate subcarrier spacing (SCS). In the NR V2X, a minislot (e.g., 2/4/7 symbols) smaller than 14 symbols may be supported as a unit of minimum scheduling.

The DM-RS, the PT-RS, the CSI-RS, the SRS, and the AGC training signal have been discussed as a candidate of the RS.

Figure 11B:
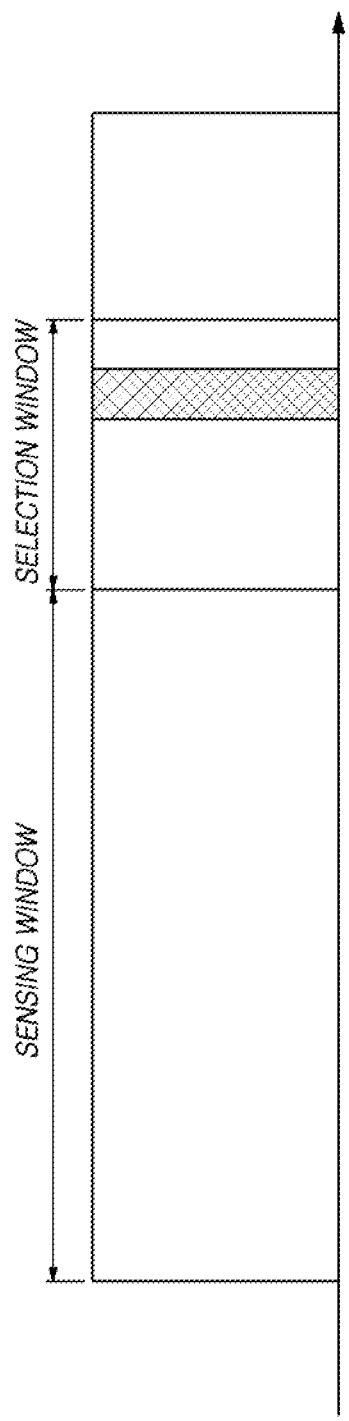

The following four options have been discussed for multiplexing of a PSCCH and an associated PSSCH, as illustrated in FIGS. 11A and 11B. Option 2 is similar to the multiplexing of the PSCCH and the PSSCH in the LTE V2X.

Synchronization Mechanism

NR V2X sidelink synchronization may include one or more sidelink synchronization signals and the PSBCH, and a sidelink source may include a UE in addition to the GNSS, and/or the gNB.

Resource Allocation

At least two sidelink resource allocation modes, i.e. mode 3 and mode 4, may by defined for NR V2X sidelink communication. In mode 3, a base station schedules one or more sidelink resources used by a UE for sidelink transmission. In mode 4, a UE determines one or more resources within one or more sidelink resources configured by a base station or one or more pre-configured sidelink resources.

Mode 4 may cover the following resource allocation sub-modes. That is, UE may automatically select a sidelink resource for transmission, help to select a sidelink resource for other UE(s), be configured with grant configured for sidelink transmission, or schedule the sidelink transmission of other UE(s).

V2X Resource Pool (Sensing and Selection Windows)

A V2X UE may transmit a message (or a channel) over a pre-defined (or signaled) resource pool. The resource pool may mean a set of one or more resources pre-defined for enabling the UE to perform the V2X operation (or in the UE capable of performing the V2X operation). In this case, the resource pool may be defined in terms of time-frequency. The V2X transmission resource pool may be defined as various types.

FIGS. 11A and 11B are illustrates a type of a V2X transmission resource pool.

Referring to FIG. 11A, V2X transmission resource pool #A may be a resource pool that allows partial sensing only. A V2X transmission resource selected by the partial sensing is remained semi-statically at a regular interval.

Referring to FIG. 11B, V2X transmission resource pool #A may be a resource pool that allows a random selection only. In V2X transmit resource pool #B, a UE does not perform partial sensing, and the UE may randomly select a V2X transmission resource in a selection window.

As one example, unlike a resource pool allowing for partial sensing only, in a resource pool allowing the random selection only, a selected resource may be configured/signaled not to be semi-statically reserved. In order for a UE to perform a V2X message transmission operation over a V2X transmission resource pool, a base station may cause the UE not to perform a sensing operation (based on scheduling allocation decoding/energy measurement).

Although not illustrated in FIGS. 11A and 11B, a resource pool over allowing both the partial sensing and the random selection may be used as well. A base station may notify a UE that a V2X resource may be selected by either of the partial sensing and the random selection.

In this specification, a frequency, a frame, a subframe, a resource, a resource block, a region, a band, a subband, a control channel, a data channel, a synchronization signal, various reference signals, various signals, or various messages in relation to NR (New Radio) may be interpreted as meanings used at present or in the past or as various meanings to be used in the future.

NR(New Radio)

Recently, the 3GPP has approved the "Study on New Radio Access Technology", which is a study item for research on next-generation/5G radio access technology. On the basis of the Study on New Radio Access Technology, in RAN WG1, discussions have been in progress on frame structures, channel coding and modulation, waveforms, multiple access schemes, and the like for the NR. The NR is required to be designed not only to provide an improved data transmission rate, but also to meet various QoS requirements for each detailed and specific usage scenario, compared to the LTE/LTE-Advanced.

In particular, an enhanced mobile broadband (eMBB), massive machine-type communication (mMTC), and ultra-reliable and low latency communication (URLLC) are defined as representative usage scenarios of the NR. In order to meet requirements for each usage scenario, it is required to design the NR to have a more flexible frame structure as compared to the LTE/LTE-Advanced.

Since each usage scenario imposes different requirements for data rates, latency, coverage, etc., there arises a need for a method of efficiently multiplexing numerology-based (e.g., a subcarrier spacing (SCS), a subframe, a transmission time interval (TTI), etc.) radio resource units different from each other, as a solution for efficiently satisfying requirements according to usage scenarios over a frequency band provided to an NR system.

To this end, there have been discussions on i) methods of multiplexing numerologies having subcarrier spacing (SCS) values different from one another based on TDM, FDM or TDM/FDM over one NR carrier, and ii) methods of supporting one or more time units in configuring a scheduling unit in the time domain. In this regard, in the NR, a definition of a subframe has been given as one type of a time domain structure. In addition, as a reference numerology to define a corresponding subframe duration, a single subframe duration is defined as having 14 OFDM symbols of normal CP overhead based on 15 kHz subcarrier spacing (SCS), like the LTE. Therefore, the subframe of the NR has the time duration of 1 ms.

Unlike the LTE, since the subframe of the NR is an absolute reference time duration, a slot and a mini-slot may be defined as a time unit for actual UL/DL data scheduling. In this case, the number of OFDM symbols which constitutes a slot, a value of y, has been defined as y=14 regardless of the numerology.

Therefore, a slot may be made up of 14 symbols. In accordance with a transmission direction for a corresponding slot, all symbols may be used for DL transmission or UL transmission, or the symbols may be used in the configuration of a DL portion+a gap+a UL portion.

Further, a mini-slot has been defined to be made up of fewer symbols than the slot in a numerology (or SCS), and as a result, a short time domain scheduling interval may be configured for UL/DL data transmission or reception based on the mini-slot. Also, a long time domain scheduling interval may be configured for the UL/DL data transmission or reception by slot aggregation.

Particularly, in the case of the transmission or reception of latency critical data, such as the URLLC, when scheduling is performed on a slot basis based on 1 ms (14 symbols) defined in a frame structure based on a numerology having a small SCS value, for example, 15 kHz, latency requirements may be difficult to be satisfied. To this end, a mini-slot made up of fewer OFDM symbols than the slot may be defined, and thus the scheduling for the latency critical data, such as the URLLC, may be performed based on the mini-slot.

As described above, it is also contemplated to schedule the data according to the latency requirement based on the length of the slot (or minislot) defined by the numerology by supporting the numerology with the different SCS values in one NR carrier by multiplexing them in the TDM and/or FDM manner. For example, as shown in FIG. 12, when the SCS is 60 kHz, the symbol length is reduced to about ¼ of that of the SCS 15 kHz. Therefore, when one slot is made up of 14 OFDM symbols, the slot length based on 15 kHz is 1 ms whereas the slot length based on 60 kHz is reduced to about 0.25 ms.

Thus, since different SCSs or different TTI lengths from one another are defined in the NR, technologies have been developed for satisfying requirements of each of the URLLC and the eMBB.

<Bandwidth Part; BWP>

The typical LTE system supports scalable bandwidth operations for any LTE CC (component carrier). That is, according to a frequency deployment scenario, an LTE provider may configure a bandwidth of a minimum of 1.4 MHz to a maximum of 20 MHz in configuring a single LTE CC, and a normal LTE UE supports a transmission/reception capability of a bandwidth of 20 MHz for a single LTE CC.

Figure 13:
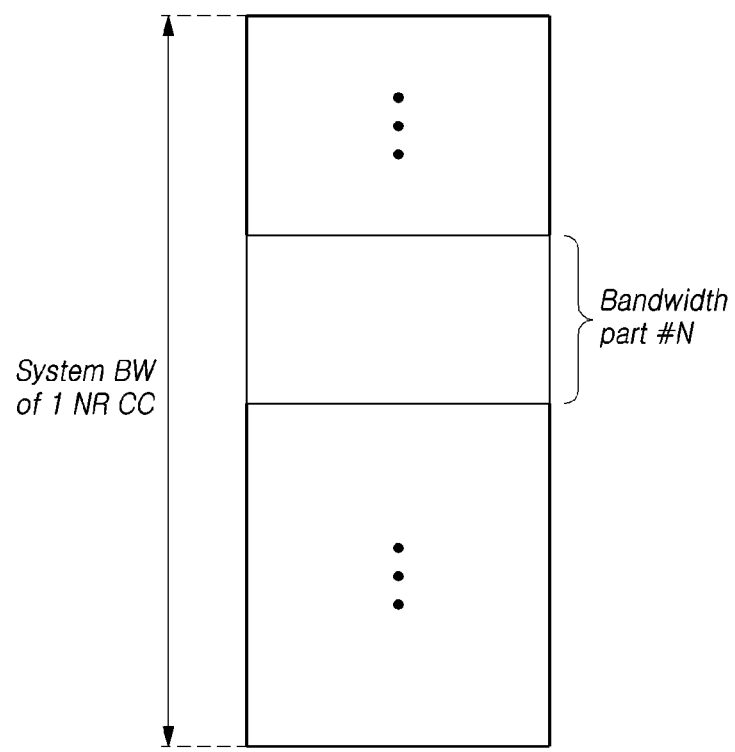
FIG. 13 is a view schematically illustrating a bandwidth part to which embodiments of the present disclosure may be applied.

However, the NR is designed to support the UE of NR having different transmission/reception bandwidth capabilities over a single wideband NR CC. Accordingly, it is required to configure one or more bandwidth parts (BWPs) including subdivided bandwidths for an NR CC as shown FIG. 13, thereby supporting a flexible and wider bandwidth operation based on configuration and activation of different bandwidth parts for respective UEs.

Specifically, one or more bandwidth parts may be configured through a single serving cell configured for a UE in NR, and the UE is defined to activate one downlink (DL) bandwidth part and one uplink (UL) bandwidth part to use the same for uplink/downlink data transmission/reception in the corresponding serving cell. In addition, in the case where a plurality of serving cells is configured for the UE (i.e., the UE to which CA is applied), the UE is also defined to activate one downlink bandwidth part and/or one uplink bandwidth part in each serving cell to use the same for uplink/downlink data transmission/reception by utilizing radio resources of the corresponding serving cell.

Specifically, an initial bandwidth part for an initial access procedure of a UE may be defined in a serving cell; one or more UE-specific bandwidth parts may be configured for each UE through dedicated RRC signaling, and a default bandwidth part for a fallback operation may be defined for each UE.

It is possible to define simultaneously activating and using a plurality of downlink and/or uplink bandwidth parts according to the capability of the UE and the configuration of the bandwidth parts in a serving cell. However, NR rel-15 defined activating and using only one downlink (DL) bandwidth part and one uplink (UL) bandwidth part at a time in a UE.

LTE Sidelink

In the LTE system a radio channel and a radio protocol are defined for transmission/reception of the side link transmission/reception of the sidelink which is a direct link between UEs in order to provide device-to-device direct communication and a vehicle-to-everything (V2X) (in particular, vehicle-to-vehicle (V2V)) service. With respect to the sidelink, the PSSS/SSSS and a physical sidelink broadcasting channel (PSBCH) are defined. The PSSS/SSSS is a signal for synchronizing between a radio sidelink transmission end and a radio sidelink reception end, and the PSBCH is for transmitting/receiving a sidelink master information block (MIB) related to the PSSS/SSSS. Further, a physical sidelink discovery channel (PSDCH) is defined for transmitting/receiving discovery information, a physical sidelink control channel (PSCCH) is defined for transmitting/receiving sidelink control information (SCI), and a physical sidelink shared channel (PSSCH) is defined for transmitting/receiving sidelink data.

In the LTE, Mode 1 and Mode 3 are defined as modes for managing UE-side communication resources by a base station.

A Sidelink Transmission Procedure in LTE Mode 1

A base station configures a resource pool for transmitting a physical sidelink control channel (PSCCH) to all UEs. The corresponding pool is divided based on a unit of an area formed of two subframes and a bandwidth of 1RB (1×4=4RB in total), and then an index formed of 6 bits is allocated to each area. The index is allocated to only the upper half band of the resource pool, and all sidelink UEs repeatedly transmit identical sidelink control information (SCI) over an identical location of the lower half band thereof (8RB in total).

When a UE transmits a scheduling request (SR) to a base station over a physical uplink control channel (PUCCH), the base station transmits a PSCCH index of 6 bits and time/frequency resource information of the data region using downlink control information (DCI) Format 5 over a physical downlink control channel (PDCCH).

The UE transmits an SCI format 0 message over a PSCCH resource indicated by the 6 bits based on the received information. Information received by the DCI Format 5 is used for the data region resource in the message. The UE encodes data to be sent using a preset MCS value, map the encoded data to a corresponding data region resource, and then transmits mapped data.

Other UEs continue to search the inside of the resource pool for PSCCH transmission. When a PSCCH transmitted by a desired user is detected, the other UEs perform sidelink reception by detecting a data region resource location, an MCS, or the like based on a corresponding SCI message.

A Sidelink Transmission Procedure in LTE Mode 3

A base station configures a resource pool for physical sidelink control channel (PSCCH) transmission to all UEs. The PSCCH and a PSSCH indicated by the PSCCH may be configured to be adjacent or independent to each other. When they are independently configured, a resulted configuration is similar to LTE Mode 1 except that the corresponding pool is divided into one subframe and areas of consecutive two RBs (2×2=4RB in total), and then an index formed of k bits is allocated to each area. The k depends on a band size of the configured resource pool. When the PSCCH and the PSSCH indicated by the PSCCH are configured to be adjacent to each other, the band of the configured resource pool is frequency-divided into sub-channels with a pre-configured RB-based size of at least 4, and an index of k bits is allocated to the two lowest RBs of each sub-channel as a PSCCH transmission candidate area (2×2=4 RBs in total). The k depends on the band of the configured resource pool, that is, the number of sub-channels. In the case of Mode 3, SCI is not transmitted repeatedly.

When a UE transmits a scheduling request (SR) to a base station over a PUCCH, the base station transmits a PSCCH index of k bits and time/frequency resource information of the data region using DCI Format 5 over a PDCCH.

The UE transmits an SCI format 1 message over a PSCCH resource indicated by the k bits based on the received information. Information received by the DCI Format 5A is used for the data region resource in the message. Thereafter, the UE maps data to be sent to a corresponding data region resource and transmits the mapped data.

A subsequent procedure is the same as that in Mode 1.

NR V2X(Sidelink)

In the NR, there are studies in progress for V2X related standardization for supporting the sidelink and satisfying changed service requirements, and the following four new service scenarios are assumed.

Vehicles Platooning enables vehicles to dynamically form platoons that move together. All vehicles included in a platoon acquire information from a leading vehicle to manage the platoon. This information enables vehicles i) to drive with more being adjacent to one another in a coordinated manner compared to a normal situation and ii) to move in the same direction together.

Extended Sensors enable raw or processed data collected via local sensors or live video images to be exchanged between vehicles, road site devices, pedestrian devices and V2X application servers. As a result, vehicles are able to raise environmental awareness beyond what their sensors can detect and have a broader and holistic view for a corresponding local situation. The high rate of data transmission is one of main features of this service scenario.

Advanced Driving enables semi-automatic or fully automatic driving. This service scenario enables each vehicle and/or RSU to share its own perception data obtained from local sensors with nearby vehicles and vehicles to synchronize and adjust trajectories or maneuvers. Each vehicle shares a driving intention with nearby driving vehicles.

Remote Driving enables a remote driver or a V2X application to drive i) a vehicle in a hazardous environment or ii) a remote vehicle for passengers which cannot drive on its own. For example, driving based on cloud computing may be used when variations are limited and routes are predictable as in the public transportation. High reliability and low latency are main requirements of this scenario.

Meanwhile, in the NR V2X, an agreement has been tentatively reached on supporting Mode 1 in which a base station manages communication resources between UEs and Mode 2 in which communication resources are managed by communication between UEs. In particular, in Mode 2, an agreement has been reached on the following four transmission types, and respective types have been represented as Mode 2-(a)~Mode 2-(d) or Mode 2a~Mode 2d.

Mode-2a: A UE autonomously selects sidelink resource for transmission.

Mode-2b: The UE assists sidelink resource selection for other UE(s).

Mode-2c: The UE is configured with NR configured grant (type-1 like) for sidelink transmission.

Mode-2d: The UE schedules sidelink transmissions of other UEs.

However, an agreement has been reached that the Mode-2b for transmitting subsequent channel configuration assistant information is defined as additional functions of the other three modes, and therefore, it will not be operated any longer as a single mode.

A Method of Allocating a HAM) ACK/NACK Feedback Resource

According to a PUCCH resource allocation method for HARQ ACK/NACK feedback of a UE defined in the NR, a base station configure a PUCCH resource set including one or more PUCCH resources for a UE and indicate PUCCH resource information to be used for HARQ ACK/NACK feedback in response to a PDSCH transmission using an ACK resource indicator (ARI) information area of the DCI. In this case, the PUCCH resource set is configured for each UL BWP configured for a corresponding UE, and separate PUCCH resource set(s) may be configured according to a payload size of HARQ ACK/NACK for a UL BWP.

In one embodiment, when a cellular link of a receiver UE is configured and when the receiver UE is in an RRC connected state with a base station/cell, the receiver UE is configured with one or more resource set(s) for each UL bandwidth part (UL BWP) for HARQ ACK/NACK feedback for PDSCH reception from a gNB. In this case, PUCCH resources of the one or more PUCCH resource sets may be reused for sidelink HARQ ACK/NACK feedback. For example, for HARQ ACK/NACK feedback resource allocation for sidelink PSSCH reception, ACK/NACK timing indication information and ACK resource indicator (ARI) information may be included in DL control information (DCI) or sidelink control information (SCI) that a base station or a transmitter UE transmits.

Accordingly, the receiver UE may derive resource allocation information for transmitting HARQ ACK/NACK feedback information on the PSSCH reception based on the HARQ ACK/NACK timing indication information and the ARI information. In this case, the HARQ ACK/NACK timing indication information may be timing gap information between a slot for transmitting and receiving PSSCH and a slot for transmitting HARQ ACK/NACK.

Alternatively, one or more separate PUCCH resource set(s) for sidelink HARQ ACK/NACK feedback may be configured for each UL BWP. Separately from one or more PUCCH resource set(s) configured for a cellular link for each UL BWP, a base station may configure one or more PUCCH resource sets for the sidelink and transmit the configured one or more PUCCH resource set(s) to a corresponding UE through higher layer signaling. Accordingly, sidelink HARQ ACK/NACK feedback resource allocation by the ARI may be performed based on one or more sidelink PUCCH resource set(s).

In another embodiment, a base station may configure or pre-configure a sidelink BWP for sidelink transmission/reception for each UE. In this case, a PUCCH resource set for HARQ ACK/NACK feedback may be configured for each sidelink BWP. One or more PUCCH resource(s) for transmitting the HARQ ACK/NACK feedback by a receiver UE may be allocated over one or more PUCCH resource set(s) configured for an active sidelink BWP for a corresponding receiver UE.

Accordingly, a corresponding ARI may be indicated and interpreted for one or more PUCCH resource(s) configuring one or more PUCCH resource set(s) of the active sidelink BWP. In one embodiment, a sidelink BWP for a UE may be configured to have a correspondence to an UL BWP configuration configured for the UE. For example, the sidelink BWP may be configured to be equal to the UL BWP configuration. In this case, a PUCCH resource set for each sidelink BWP may be configured to be equal to a PUCCH resource set configuration for each UL BWP of a corresponding UE.

In another embodiment, an associated PUCCH resource set may be configured for each resource pool configured for PSSCH or PSCCH transmission. That is, when a base station transmits sidelink resource pool setting information through UE-specific or cell-specific higher layer signaling, the corresponding sidelink resource pool setting information may include associated PUCCH resource set (or associated PUCCH resource pool) configuration information for the corresponding resource pool.

Accordingly, the PUCCH resource set allocation method based on the ARI described above is equally applied. In a method of indicating and interpreting the ARI, the corresponding ARI may be indicated and interpreted based on a resource pool for transmitting a corresponding PSSCH or PSCCH and an associated PUCCH resource set (or an associated PUCCH resource pool).

In one embodiment, a receiver UE may transmit sidelink HARQ ACK/NACK feedback information over the PSCCH. In this case, a separate SCI format for the HARQ ACK/NACK feedback information may be defined. The SCI format for the HARQ ACK/NACK feedback may be configured with identification information of a sidelink PSSCH received by a corresponding UE and ACK/NACK feedback information related to it. The PSSCH identification information may include information on the number of PSSCH receptions, information on a resource pool index or a sub-channel index over which the PSSCH reception is performed, or timing offset information by which PSSCH information reception is performed. Further, the PSSCH identification information may be indicated based on bitmaps or index information.

When sidelink HARQ ACK/NACK feedback is transmitted over the PSCCH, a resource pool is configured for transmitting the PSCCH including the HARQ ACK/NACK feedback information and then transmitted to a sidelink UE through higher layer signaling, or may be pre-configured. At this time, for example, a resource pool for transmitting feedback control information, such as feedback control information (FCI), may be configured independently from a resource pool for transmitting the PSSCH and then transmitted through higher layer signaling, or pre-configured.

In this case, PSCCH resource allocation information to be used for HARQ ACK/NACK feedback by a receiver UE may be configured with allocation information on an FCI resource pool for PSCCH transmission and allocation information on a PSCCH to be used in the corresponding FCI resource pool. For example, the PSCCH allocation information may be sub-channel allocation information. The FCI resource pool allocation information and the PSCCH allocation information may be explicitly indicated by a DCI format or a SCI format. Alternatively, the FCI resource pool allocation information and the PSCCH allocation information may be implicitly determined by a function of a sub-channel index.

In one embodiment, two sidelink HARQ feedback modes may be defined based on i) a node to which a sidelink receiver UE transmits HARQ ACK/NACK feedback information or ii) an air interface link over which the sidelink receiver UE transmits the HARQ ACK/NACK feedback information. Specifically, a first HARQ feedback mode may be defined as a mode in which a sidelink receiver UE directly transmits HARQ ACK/NACK feedback information in response to the reception of a PSSCH to a gNB. A second HARQ feedback mode may be defined as a mode in which a sidelink receiver UE directly transmits HARQ ACK/NACK feedback information to a transmitter UE that has transmitted a PSSCH.

That is, in the first HARQ feedback mode, HARQ ACK/NACK feedback information for the PSSCH may be transmitted to a gNB through a Uu interface, for example, a cellular link such as UL. Further, in the second HARQ feedback mode in accordance with a first embodiment, the HARQ ACK/NACK feedback information for the PSSCH may be directly transmitted to a transmitter UE through PC5, i.e. a sidelink.

In another embodiment, two sidelink HARQ feedback modes may be defined based on whether a receiver UE transmits HARQ ACK feedback information. Specifically, a third HARQ feedback mode may be defined as a mode in which feedback information is transmitted for both ACK and NACK according to a data reception result. Further, a fourth HARQ feedback mode may be defined as a mode in which feedback information is transmitted for only NACK.

That is, in the third HARQ feedback mode, feedback for HARQ ACK may be explicitly performed when the sidelink receiver UE successfully decodes the received PSSCH. When the sidelink receiver UE does not successfully decode the received PSSCH, feedback for HARQ NACK may be explicitly performed. Unlike this, in the fourth HARQ feedback mode, HARQ ACK information may not be transmitted when the sidelink receiver UE successfully decodes the received PSSCH, and only when the sidelink receiver UE does not successfully decode the received PSSCH, feedback for HARQ NACK may be explicitly performed.

In one embodiment, a HARQ feedback mode for a receiver UE may be explicitly set or indicated. Such a method of explicitly setting or indicating a HARQ feedback mode may be commonly applied to the embodiments related to defining the HARQ feedback mode as described above.

As an example of setting a HARQ feedback mode, when establishing a sidelink unicast or groupcast session, HARQ feedback mode configuration information on the sidelink may be transmitted to corresponding sidelink UEs through higher layer signaling.

In another embodiment for setting a HARQ feedback mode, the HARQ feedback mode may be dynamically indicated over the PSCCH. To do this, an information area for indicating the HARQ feedback mode may be defined in a SCI format including scheduling control information for PSSCH transmission. Alternatively, the HARQ feedback mode may be dynamically indicated over the PDCCH. An information area for indicating the HARQ feedback mode may be defined in a DCI format for sidelink scheduling control information transmitted by a base station.

Alternatively, HARQ feedback mode setting information of the sidelink may be transmitted to a UE through cell-specific or UE-specific higher layer signaling for each cell.

In another embodiment of setting a HARQ feedback mode, the HARQ feedback mode may be set for each resource pool. That is, when a base station transmits resource pool setting information for the sidelink, HARQ feedback mode setting information for the corresponding resource pool may be included in the resource pool setting information.

In another embodiment, a HARQ feedback mode for a receiver UE may be implicitly set or indicated. Specifically, a HARQ feedback mode may be determined according to whether a transmitter UE or a receiver UE is connected to a cellular link, for example, whether an RRC connection to a base station is established, or a coverage state.

In one embodiment, the HARQ feedback mode may be determined according to whether the RRC connection of a receiver UE is established. That is, when the RRC connection of the receiver UE is established, a first HARQ feedback mode may be performed for feeding back HARQ ACK/NACK information to a gNB. When the RRC connection is not established, a second HARQ feedback mode may be performed for directly transmitting HARQ ACK/NACK feedback information to a transmitter UE.

In another embodiment, a HARQ feedback mode may be determined according to whether the RRC connections of both a receiver UE and a transmitter UE are established. That is, only when the RRC connections of both the receiver UE and the transmitter UE are established, the first HARQ feedback mode may be performed for feeding back HARQ ACK/NACK information to a gNB. When the RRC connection of at least one of the receiver UE and the transmitter UE is not established, the second HARQ feedback mode may be performed for directly transmitting HARQ ACK/NACK feedback information to the transmitter UE.

Additionally, a HARQ feedback mode may be differently determined according to whether a gNB or a cell with which the transmitter UE establishes the RRC connection is equal to a gNB or a cell with which the receiver UE establishes the RRC connection. That is, even when both the transmitter UE and the receiver UE are in RRC connected state, when the transmitter UE and the receiver UE establish the RRC connections with respective gNBs or cells, which are different from each other, the second HARQ feedback mode may be performed for directly transmitting HARQ ACK/NACK feedback information to the transmitter UE.

In further another embodiment, a HARQ feedback mode may be determined by a sidelink transmission mode of a sidelink UE.

In yet another embodiment, a HARQ feedback mode may be determined based on HARQ ACK/NACK feedback timing information for the reception of the PSSCH by a receiver UE.

For example, when a slot of a receiver UE corresponding to a HARQ ACK/NACK feedback timing set or indicated by a base station or a transmitter UE is a cellular UL slot (e.g., an Uu link slot), the first HARQ feedback mode may be performed for directly transmitting HARQ ACK/NACK feedback information to the base station. For another example, when a slot of a receiver UE corresponding to a HARQ ACK/NACK feedback timing set or indicated by a base station or a transmitter UE is a sidelink slot, the second HARQ feedback mode may performed for directly transmitting HARQ ACK/NACK feedback information to the transmitter UE.

In yet another embodiment, a HARQ feedback mode for a receiver UE may be implicitly set or indicated. Specifically, the HARQ feedback mode may be determined based on whether the reception of sidelink data is a unicast data reception or a groupcast data reception.

For example, when the unicast sidelink data are received, the HARQ feedback mode may be performed by the third HARQ feedback mode. That is, in this case, feedback for both HARQ ACK and NACK may be explicitly performed. For another example, when the groupcast sidelink data are received, the HARQ feedback mode may be performed by the fourth HARQ feedback mode. That is, feedback for only HARQ NACK may be explicitly performed.

Hereinafter, a method of transmitting sidelink data is specifically discussed with reference to drawings.

Figure 14:
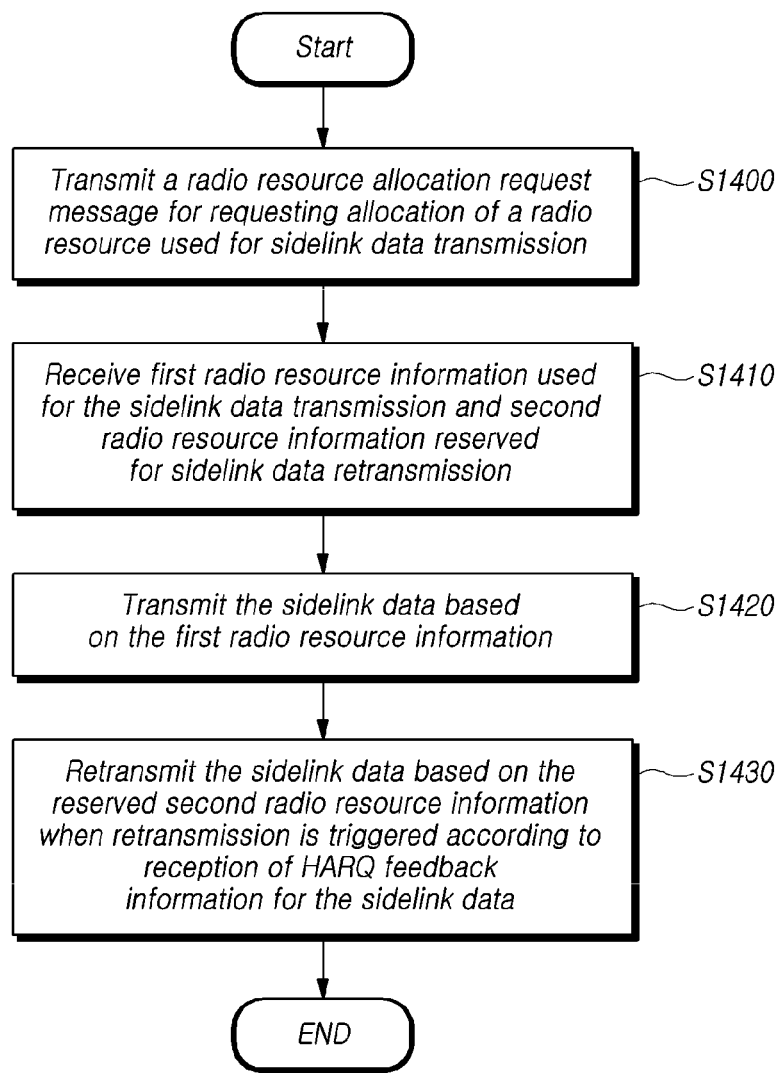
FIG. 14 is a flow diagram illustrating a procedure through which a transmitter UE transmits sidelink data in accordance with embodiments of the present disclosure.

FIG. 14 is a flow diagram illustrating a procedure of a transmitter UE for transmitting sidelink data in accordance with embodiments of the present disclosure.

Referring to FIG. 14, a transmitter UE (e.g., transmitting UE) may transmit a radio resource allocation request message for requesting the allocation of a radio resource used for sidelink data transmission, at step S1400.

Sidelink transmission/reception based on the unicast or the groupcast, as well as the broadcast, may be supported for the NR-based V2X. Accordingly, the transmitter UE may transmit sidelink data over a PSSCH according to the unicast or groupcast scheme.

In one embodiment, in order for the transmitter UE to transmit sidelink data, the transmitter UE may request allocation information on a radio resource to be used when transmitting sidelink data. The transmitter UE may transmit a radio resource allocation request message for requesting the allocation of a radio resource to a base station or a scheduling UE according to a sidelink transmission mode.

In one embodiment, when transmitting the resource request to the base station, the transmitter UE may transmit the resource request over a typical PUCCH. On the other hand, when transmitting the resource request to the scheduling UE, the transmitter UE may transmit the resource request over a PSSCH or PSFCH, which is a sidelink channel, or a new sidelink physical channel.

Referring back to FIG. 14, the transmitter UE may receive first radio resource information used for the sidelink data transmission and second radio resource information reserved for sidelink data retransmission, at step S1410.

According to the scheduling request of the transmitter UE, the base station or the scheduling UE may allocate a radio resource to be used for transmitting sidelink data. In this case, in one embodiment, the radio resource may be allocated with 'N' multiple resource pools taking into account the number of retransmissions of the sidelink data. Here, the retransmission of the sidelink data means that when sidelink data have not received by a receiver UE, sidelink data identical to the transmitted sidelink data are transmitted again. That is, when a radio resource for the transmission of sidelink data is allocated, a resource reservation for a radio resource for retransmission of the sidelink data may be performed.

The first radio resource may be a resource pool allocated for initially transmitting sidelink data, and the second radio resource may be a resource pool reserved for retransmitting the sidelink data. When the sidelink data are not successfully transmitted, the transmitter UE may retransmit the sidelink data using the reserved second radio resource without a procedure of requesting resource allocation for retransmitting the sidelink data to the base station or the scheduling UE.

The number of multiple resource pools, N, allocated by the base station or the scheduling UE according to the scheduling request of the transmitter UE may correspond to the sum of the first and second radio resources. That is, one radio resource allocated for initially transmitting sidelink data. When the initially transmitted sidelink data are not received, N−1 radio resources reserved for retransmission up to N−1 times may be simultaneously allocated as multiple resource pools.

When the transmitter UE requests the allocation of a resource pool required for unicast/groupcast transmission to the base station or the scheduling UE, the base station or the scheduling UE may allocate N resource pools at one time taking the number of retransmissions into account. Through this, when receiver UEs have transmitted HARQ NACK feedback to the transmitter UE, a procedure of allocating a resource pool again may be omitted.

In one embodiment, the base station or the scheduling UE may flexibly adjust the number of multiple resource pools, N, taking into account channel situations of the receiver UEs. The base station or the scheduling UE may set the number of resource pools taking into account the number of retransmissions suitable for a communication link from the transmitter UE to at least one receiver UE based on channel situation information. In this case, one more than the number of retransmissions may be set as the N.

The channel information may include a wideband channel quality indicator (CQI), a subband CQI, a precoding matrix indicator (PMI), a Rank Indicator (RI), or the like. In this case, a representative value representing the CQI may be a modulation coding scheme (MCS). That is, the number of retransmissions may be mapped according to the MCS fed back from a UE.

In case of the unicast, since only a single receiver UE performs reception and feeds back ACK/NACK or channel state information (CSI), corresponding information may be utilized as it is. Unlike this, in case of the groupcast, for example, the number of multiple resource pools, N, may be set using the CSI of a receiver UE that fed back worst CQI. The number of multiple resource pools, N, may be set using the average CSI of receiver UEs. The number of multiple resource pools, N, may be set using the average CSI of receiver UEs corresponding to a lower 'X'%. The number of multiple resource pools, N, may be set using the average CSI of receiver UEs corresponding to an upper 'X'%.

In another embodiment, the number of resource pools may be differently set according to which of the unicast or the groupcast is used. In one embodiment, in case of the unicast, resource allocation may be performed based on a single resource pool identical to a typical implementation. Unlike this, in case of the groupcast, resource allocation may be performed based on two resource pool allocation.

In one embodiment, when a base station transmits multiple resource pool allocation information, the base station may transmit it to all V2X UEs having established a communication link over a PDCCH. Unlike this, when a scheduling UE transmits multiple resource pool allocation information, the scheduling UE may transmit it to a transmitter UE over a sidelink physical channel. In this case, a PSSCH/PSCCH or a new sidelink physical channel may be applicable as the sidelink physical channel.

Referring back to FIG. 14, the transmitter UE may transmit sidelink data based on the first radio resource information, at step S1420.

The transmitter UE may perform initial transmission of the sidelink data using the allocated first radio resource information. In one embodiment, to do this, the first radio resource information and the second radio resource information may be transmitted to a receiver UE by being included in identical sidelink control information (SCI).

The receiver UE may monitor sidelink data over a first radio resource indicated by the control information. The receiver UE may transmit HARQ ACK/NACK feedback information to the transmitter UE over a PSFCH according to whether the sidelink data are received.

Referring back to FIG. 14, when retransmission is triggered according to the reception of hybrid automatic repeat request (HARQ) for the sidelink data, the transmitter UE may retransmit the sidelink data based on the reserved second radio resource information, at step S1430.

When the HARQ NACK feedback information is received for the transmitted sidelink data, the transmitter UE may perform the retransmission of sidelink data identical to the transmitted sidelink data. In this case, the transmitter UE may immediately retransmit the sidelink data using previously allocated second radio resource. That is, a resource allocation request for the retransmission to the base station or the scheduling UE may not be needed.

According to this, it is possible to provide methods and apparatuses for rapidly retransmitting sidelink data by supporting a resource reservation for a radio resource used for the retransmission of the sidelink data based on HARQ feedback information.

As discussed above, the setting of the number of multiple resource pools, N, has been performed by a base station or a scheduling UE; however, embodiments of the present disclosure are not limited thereto. In another embodiment, when requesting resource allocation, a transmitter UE may request the allocation of N multiple resource pool(s). That is, the transmitter UE may request the allocation of N multiple resource pool(s) to a base station over a PUCCH. The transmitter UE may request the allocation of N multiple resource pool(s) to a scheduling UE over a sidelink physical channel. Since the above descriptions may be substantially equally applied to subsequent/following operations without departing from the spirit and the scope of the present disclosure, detailed description thereof are not be repeated here for brevity.

Figure 15:
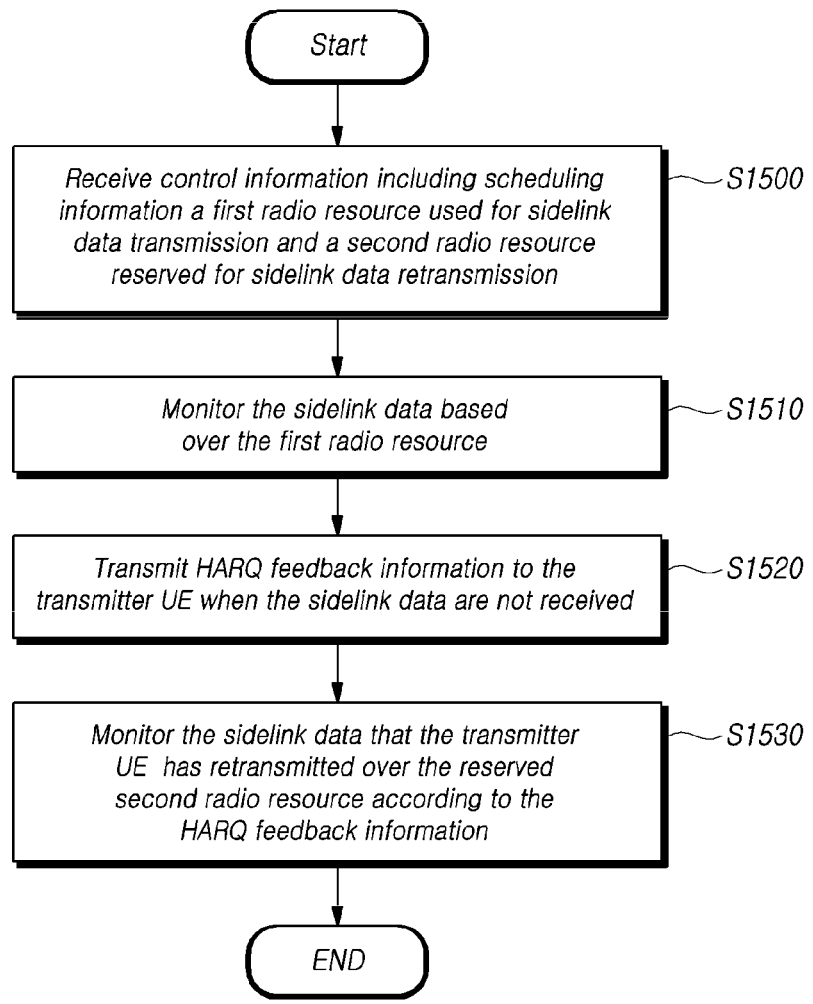
FIG. 15 is a flow diagram illustrating a procedure through which a receiver UE receives sidelink data in accordance with embodiments of the present disclosure.

FIG. 15 is a flow diagram illustrating a procedure of a receiver UE for receiving sidelink data in accordance with embodiments of the present disclosure.

Referring to FIG. 15, a receiver UE may receive control information including scheduling information on a first radio resource used for sidelink data transmission and a second radio resource reserved for sidelink data retransmission from a transmitter UE, at step S1500.

For example, in order for the transmitter UE to transmit sidelink data, the transmitter UE may request allocation information on a radio resource to be used when transmitting sidelink data. The transmitter UE may transmit a radio resource allocation request message for requesting the allocation of a radio resource to a base station or a scheduling UE according to a sidelink transmission mode.

In one embodiment, when transmitting the resource request to the base station, the transmitter UE may transmit the resource request over a typical PUCCH. On the other hand, when transmitting the resource request to the scheduling UE, the transmitter UE may transmit the resource request over a PSSCH or PSFCH, which is a sidelink channel, or a new sidelink physical channel.

The transmitter UE may receive first radio resource information used for the sidelink data transmission and second radio resource information used for sidelink data retransmission. According to the scheduling request of the transmitter UE, the base station or the scheduling UE may allocate a radio resource to be used for transmitting sidelink data. In this case, in one embodiment, the radio resource may be allocated with 'N' multiple resource pools taking into account the number of retransmissions of the sidelink data. That is, when a radio resource for the transmission of sidelink data is allocated, a resource reservation may be performed for reserving a radio resource for retransmission of the sidelink data.

The first radio resource may be a resource pool allocated for initially transmitting sidelink data, and the second radio resource may be a resource pool reserved for retransmitting the sidelink data. When the sidelink data are not successfully transmitted, the transmitter UE may retransmit the sidelink data using the reserved second radio resource without a procedure of requesting resource allocation for retransmitting the sidelink data to the base station or the scheduling UE.

The number of multiple resource pools, N, allocated by the base station or the scheduling UE according to the scheduling request of the transmitter UE may correspond to the sum of the first and second radio resources. That is, i) one radio resource allocated for initially transmitting sidelink data and ii) N−1 radio resources reserved for retransmission up to N−1 times when the initially transmitted sidelink data are not received, may be simultaneously allocated as multiple resource pools.

When the transmitter UE requests the allocation of a resource pool required for unicast/groupcast transmission to the base station or the scheduling UE, the base station or the scheduling UE may allocate N resource pools at one time taking the number of retransmissions into account. Through this, when receiver UEs have transmitted HARQ NACK feedback to the transmitter UE, a procedure of allocating a resource pool again may be omitted.

In one embodiment, the base station or the scheduling UE may flexibly adjust the number of multiple resource pools, N, taking into account channel situations of the receiver UEs. The base station or the scheduling UE may set the number of resource pools taking into account the number of retransmissions suitable for a communication link from the transmitter UE to at least one receiver UE based on channel situation information. In this case, one more than the number of retransmissions may be set as the N.

The channel information may include a wideband channel quality indicator (CQI), a subband CQI, a precoding matrix indicator (PMI), a Rank Indicator (RI), or the like. In this case, a representative value representing the CQI may be a modulation coding scheme (MCS). That is, the number of retransmissions may be mapped according to the MCS fed back from a UE.

In one embodiment, when a base station transmits multiple resource pool allocation information, the base station may transmit it to all V2X UEs having established a communication link over a PDCCH. Unlike this, when a scheduling UE transmits multiple resource pool allocation information, the scheduling UE may transmit it to a transmitter UE over a sidelink physical channel. In this case, a PSSCH/PSCCH or a new sidelink physical channel may be applicable as the sidelink physical channel.

In one embodiment, the receiver UE may receive the first radio resource information and the second radio resource information, which are included in identical sidelink control information (SCI).

Referring back to FIG. 15, the receiver UE may monitor sidelink data over the first radio resource, at step S1510. When the sidelink data are not successfully received, the receiver UE may transmit hybrid automatic repeat request (HARQ) feedback information to the transmitter UE, at step S1520.

The receiver UE may monitor sidelink data over a first radio resource indicated by the control information. The receiver UE may transmit HARQ ACK/NACK feedback information to the transmitter UE over a PSFCH according to whether the sidelink data are received.

Referring back to FIG. 15, the receiver UE may monitor sidelink data retransmitted by the transmitter UE over the reserved second radio resource according to the HARQ ACK/NACK feedback information, at step S1530.

When retransmission is triggered according to the reception of the HARQ ACK/NACK feedback information for the sidelink data, the transmitter UE may retransmit the sidelink data using the second radio resource information. When the HARQ NACK feedback information is received for the transmitted sidelink data, the transmitter UE may perform the retransmission using a second radio resource that has been allocated previously for the identical sidelink data.

In this case, the receiver UE may monitor the second radio resource indicated by control information that has been received previously. Thereafter, the receiver UE may transmit HARQ ACK/NACK feedback information to the transmitter UE according to whether the sidelink data are received. If the sidelink data are not still successfully received, the receiver UE may transmit the HARQ ACK/NACK feedback information again to the transmitter UE.

As results, it is possible to provide methods and apparatuses for rapidly retransmitting sidelink data by supporting a resource reservation for a radio resource used for the retransmission of the sidelink data based on HARQ feedback information.

Hereinbefore, it has been assumed that a node receiving HARQ feedback information is a transmitter UE; however, without departing from the spirit and the scope of the present disclosure, the foregoing description may be substantially equally applicable to a case where the node receiving the HARQ feedback information is a base station.

Hereinafter, methods of transmitting/receiving sidelink data in the NR according to embodiments will be described in detail with reference to accompanying drawings.

According to methods of transmitting/receiving sidelink for providing the V2X service in a typical LTE system, data transmission based on the sidelink has been performed based on the broadcast. That is, sidelink communication has been performed as follows. When a transmitter UE broadcasts a sidelink radio channel or a radio signal to UEs in the vicinity without specifying a destination UE, UEs capable of receiving the corresponding broadcasting signal receive the sidelink radio channel or the radio signal. Accordingly, such a typical HARQ procedure for the PSSCH (e.g., sidelink data channel) is not applied to the LTE V2X.

However, in case of the NR-based V2X, there has arisen a necessity of supporting sidelink transmission/reception based on the unicast or the groupcast, as well as the broadcast. Accordingly, it is necessary to define a HARQ application method for a corresponding sidelink radio channel, or the like when a unicast or groupcast based sidelink transmission and reception method is defined as a NR based V2X communication type.

In accordance with embodiments of the present disclosure, a method is introduced for allocating multiple resource pools, which is not provided in the typical V2X sidelink. In particular, provided herein is a method of allocating multiple resource pools for operating an NR sidelink that is a radio link between UEs for providing the NR V2X service. According to this, since the method of allocating multiple resource pools enables rapid retransmission to be implemented, it can be highly utilized in low latency based services.

Herein, the term "receiver UE" means a UE receiving a PSCCH and a PSSCH corresponding to the PSCCH over a sidelink. The term "transmitter UE" means a UE transmitting a PSCCH and a PSSCH corresponding to the PSCCH over a sidelink. A physical sidelink channel for the sidelink feedback information described above is referred to as a physical sidelink feedback channel (PSFCH).

As described above, in the NR V2X, a data transmission mode is basically classified into mode 1 (Mode 1) and mode 2 (Mode 2). In particular, in Mode 2d, a scheduling UE or a scheduler UE is introduced. The scheduling UE or the schedule UE denotes a UE taking a role similar to a gNB unlike the LTE.

Herein, the term "scheduling or scheduler UE (S-UE)" means a UE that i) manages a transmission resource for sidelink communication performed between UEs under its management, ii) allocates a transmission resource for allocating to each link within a time/frequency resource previously set by a base station, etc. based on a scheduling request (SR) received from each UE or information received from a higher layer, and iii) performs a role of transferring the allocated transmission resource to a transmitter UE over the corresponding link.

The term "transmitter UE (Tx-UE)" means a UE that is dependent on the scheduling UE and actually performs sidelink transmission over a resource allocated by the scheduling UE.

The term "receiver UE (Rx-UE)" means a UE that receives data transmitted by a transmitter UE over a sidelink.

The term "scheduling indication message" means a message that includes time/frequency location information of the data region and is transferred by a scheduling UE like a message transferred by DCI format 5/5A of the LTE.

The term "NR sidelink control information (SCI)/sidelink control message" means a message that includes time/frequency and MCS information of the data region and is transferred by a transmitter UE to a receiver UE based on a scheduling indication message transferred by a scheduling UE like a message transferred by DCI format 5/5A of the LTE.

In accordance with embodiments of the present disclosure, a method is provided of allocating a resource pool for rapid retransmission in the NR V2X. The resource pool allocation method according to embodiments of the present disclosure may be applicable to all unicast and groupcast transmissions in both NR V2X transmission mode 1 and NR V2X transmission mode 2. Basically, resource pool allocation in the NR V2X is performed according to the following procedure.

A Resource Pool Allocation Procedure in Mode-1

Step 1: When transmitting a PSSCH, a transmitter UE requests resource allocation taking into account an amount of data needed for transmitting in actual. In this case, a corresponding procedure is performed by a scheduling request (SR), a buffer status report (BSR), etc.

Step 2: A gNB allocates a resource pool to the transmitter UE.

Step 3: The transmitter UE (Tx-UE) performs PSCCH and PSSCH data transmission over an allocated resource.

Step 4: A receiver UE (Rx-UE) transmits HARQ ACK/NACK over a PSFCH to the transmitter UE after PSCCH performing.

Thereafter, when retransmission is required, Step 1 to Step 4 are performed repeatedly.

A resource allocated by the gNB may be defined as a resource-pool, a sub-resource in the resource-pool, a resource pattern, or the like.

A resource pool allocation procedure in Mode-2

The above operations performed for the Mode-1 are substantially equally applicable in the Mode-2 except that the role of the gNB is replaced by a scheduling UE (S-UE).

In Mode-1, the SR/BSR for requesting resource allocation by a transmitter UE is performed over a typical PUCCH in Mode-1. However, the SR/BSR is performed over a sidelink physical channel in Mode-2. Such a sidelink physical channel may be the PSSCH/PSFCH or a newly defined physical channel.

A resource allocated by the S-UE may be defined as a resource-pool, a sub-resource in the resource-pool, a resource patter n, or the like.

Embodiment 1

A gNB May Allocate N Number of Multiple Resource Pools to a Transmitter UE (Sidelink Mode 1)

Herein, when requesting resource allocation for NR V2X sidelink transmission, multiple 'N' resource pools may be allocated taking the number of retransmissions into account. According to embodiments of the present disclosure, when a transmitter UE requests the allocation of a resource pool for unicast/groupcast transmission to a gNB, the gNB may allocate N resource pools at one time based on the number of retransmissions. Through this, it is possible to omit the above step 1 and step 2 which are procedures of allocating a resource pool again in response to ACK/NACK information transmitted by receiver UEs to the transmitter UE. That is, this means that, when the transmitter UE recognizes that retransmission is needed based on the ACK/NACK information transferred from receiver UEs, the transmitter UE is required to perform SR/BSR transmission for resource allocation needed for the retransmission to the gNB again; however, such a procedure may be omitted according to embodiments of the present disclosure.

For example, when the number of retransmissions is set to 1, the transmitter UE may immediately perform PSSCH retransmission based on ACK/NACK information from receiver UEs without an additional resource pool allocation request for retransmission up to at least one time. If ACK information is received from all receiver UEs for initial transmission, the remaining one resource pool previously reserved is not used for data transmission and thus eventually becomes a discarded resource.

Such multiple resource pool allocation information may be transmitted to all V2X UEs having established communication links over a PDCCH.

Embodiment 1-1

The gNB May Flexibly Adjust the Number of Multiple Resource Pools, N, Taking Into Account Channel Situations of the Receiver UEs In this embodiment, a specific reference value will be described for allocating 'N' multiple resource pools. In the NR V2X, a new transmission procedure or a use-case has been introduced for supporting the unicast/groupcast. As a result, receiver UEs may feed back ACK/NACK (PSFCH) and CSI (PSSCH) as well, unlike typical LTE V2X UEs. Accordingly, the gNB may acquire channel information on channel situations of a transmitter UE and receiver UEs. The gNB may set the number of resource pools taking into account the number of retransmissions suitable for a communication link from the transmitter UE to at least one receiver UE based on such feedback information.

The channel information may include a wideband channel quality indicator (CQI), a subband CQI, a precoding matrix indicator (PMI), a Rank Indicator (RI), or the like. In this case, a representative value representing the CQI may be a modulation coding scheme (MCS). That is, the number of retransmissions may be mapped according to the MCS fed back from a UE. In one embodiment, the setting of multiple resource pools may be performed based on an MCS value as follows.

1) $MCS\_UE < threshold\_1$: allocating 4 resource pools (taking 3 retransmissions into account)
2) $threshold\_1 \leq MCS\_UE < threshold\_2$: allocating 3 resource pools (taking 2 retransmissions into account)
3) $threshold\_2 \leq MCS\_UE < threshold\_3$: allocating 2 resource pools (taking 1 retransmission into account)
4) $threshold\_2 \leq MCS\_UE$: allocating 1 resource pool Further, in case of the unicast, since only a single receiver UE performs reception and feeds back ACK/NACK or channel state information (CSI), corresponding information may be utilized as it is. Unlike this, in case of the groupcast, one of the following several cases may be applicable.

Case 1: The number of multiple resource pools, N, may be set using the CSI of a receiver UE that fed back worst CQI.

Case 2: The number of multiple resource pools, N, may be set using the average CSI of receiver UEs.

Case 3: The number of multiple resource pools, N, may be set using the average CSI of receiver UEs corresponding to a lower 'X'%.

Case 4: The number of multiple resource pools, N, may be set using the average CSI of receiver UEs corresponding to an upper 'X'%.

Embodiment 1-2

The gNB May Flexibly Adjust the Number of Multiple Resource Pools, N, According to a Unicast/Groupcast Use-Case In this embodiment, the number of multiple resource pools may be set according to the unicast/groupcast of a UE. That is, the number of multiple resource pools may be differently set according to the unicast/groupcast corresponding to a specific use-case of a UE. In one embodiment, in the case of the unicast, a V2X resource allocation procedure may be operated based on the allocation of a single resource pool identical to a typical implementation. Unlike this, in case of the groupcast, a V2X resource allocation procedure may be configured to be operated based on the allocation of two resource pools.

Embodiment 2

A Scheduling UE (or Scheduler UE) May Allocate N Multiple Resource Pools to a Transmitter UE. (Sidelink Mode 2)

The Embodiment 1, Embodiment 1-1, and Embodiment 1-2 may be substantially equally applied to this embodiment (Embodiment 2). In this case, it should be noted that a scheduling request (SR) or a buffer status report (BSR) performed by a transmitter UE for a resource allocation request is performed over a PSSCH/PSFCH which is a sidelink channel or a new sidelink physical channel in the mode 2, while being performed over a typical PUCCH in the mode 1.

Further, resource pool allocation information may not be transmitted from a typical gNB to V2X UEs over a PDCCH, but may be transmitted from a S-UE to a transmitter UE or a receiver UE over a sidelink physical channel. The PSSCH/PSCCH or the new sidelink physical channel may be applicable as such a sidelink physical channel used in this instance.

Embodiment 3

When Requesting Resource Allocation, a Transmitter UE on its Own May Request the Allocation of N Multiple Resource Pools Unlike Embodiments 1 and 2, in this embodiment, the transmitter UE may request the allocation of multiple resource pools. That is, since the transmitter UE is able to acquire channel state information (CSI) from receiver UEs, the transmitter UE may directly request the allocation of 'N' multiple resource pools based on a value of the CSI. At this time, the transmitter UE may use a PUCCH or a PSSCH for requesting the allocation of multiple resource pools to a gNB or an S-UE. Here, if a sidelink physical channel between the S-UE and the transmitter UE is newly defined, the PSSCH may be replaced with a corresponding channel.

That is, the transmitter UE may directly transmit request information for the allocation of N resource pools rather than simply sending only an SR/BSR, to a gNB/S-UE.

To do this, the transmitter UE may perform the PUCCH transmission based on multiple SR configurations for the gNB or use a sidelink physical channel performing a similar role to it for the S-UE. That is, operations of the transmitter UE for requesting the multiple resource pools described above may be performed for each of the V2X transmission modes 1 and 2 as follows.

Embodiment 3-1

The Transmitter UE May Request the Allocation of N Multiple Resource Pools to a gNB Over a PUCCH Embodiment 3-2

The Transmitter UE May Request of the Allocation of N Multiple Resource Pools to a Scheduling UE Over a Sidelink Physical Channel According to this, it is possible to provide methods and apparatuses for rapidly retransmitting sidelink data by supporting a resource reservation for a radio resource used for the retransmission of the sidelink data based on HARQ feedback information.

Hereinafter, structures of a receiver UE and a transmitter UE capable of performing a part or all of the embodiments described with reference to FIGS. 1 to 15 will be discussed with reference to the drawings.

Figure 16:
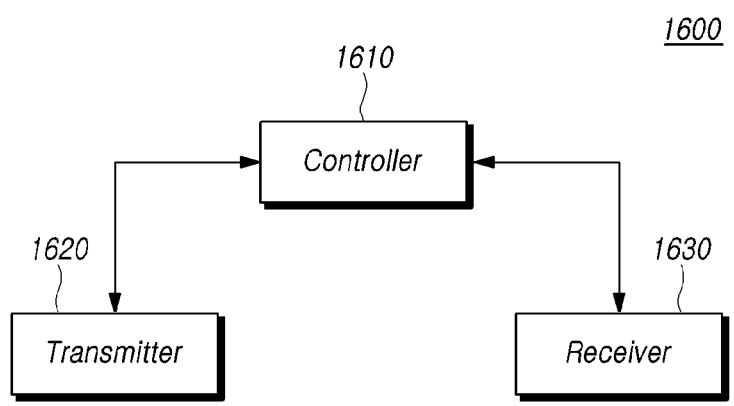
FIG. 16 is a block diagram illustrating a transmitter UE in accordance with embodiments of the present disclosure.

FIG. 16 is a block diagram illustrating a transmitter UE 1600 according to an embodiment of the present disclosure.

Referring to FIG. 16, the transmitter UE 1600 includes a controller 1610, a transmitter 1620, and a receiver 1630.

The controller 1610 controls overall operations of the transmitter UE 1600 according to methods of transmitting sidelink data needed to perform the embodiments of the present disclose described above. The transmitter 1620 transmits UL control information, sidelink control information, data, messages, or the like to a base station or one or more other UE(s) over a corresponding channel. The receiver 1630 receives DL control information, sidelink control information, data, messages, or the like from a base station or one or more other UE(s) over a corresponding channel.

The transmitter 1620 may transmit a radio resource allocation request message for requesting the allocation of a radio resource used for sidelink data transmission. The transmitter 1620 may transmit sidelink data over a PSSCH according to the unicast or groupcast scheme.

In one embodiment, in order for the transmitter 1620 to transmit sidelink data, the transmitter 1620 may request allocation information on a radio resource to be used when transmitting sidelink data. The transmitter 1620 may transmit a radio resource allocation request message for requesting the allocation of a radio resource to a base station or a scheduling UE according to a sidelink transmission mode.

In one embodiment, when transmitting the resource request to the base station, the transmitter 1620 may transmit the resource request over a typical PUCCH. When transmitting the resource request to the scheduling UE, the transmitter 1620 may transmit the resource request over a PSSCH or PSFCH, which is a sidelink channel, or a new sidelink physical channel.

The receiver 1630 may receive first radio resource information used for the sidelink data transmission and second radio resource information reserved for sidelink data retransmission. According to the scheduling request of the transmitter 1620, the base station or the scheduling UE may allocate a radio resource to be used for transmitting sidelink data. In this case, in one embodiment, the radio resource may be allocated with 'N' multiple resource pools taking into account the number of retransmissions of the sidelink data. That is, when a radio resource for the transmission of sidelink data is allocated, a resource reservation for a radio resource for retransmission of the sidelink data may be performed.

The first radio resource may be a resource pool allocated for initially transmitting sidelink data, and the second radio resource may be a resource pool reserved for retransmitting the sidelink data. When the sidelink data are not successfully transmitted, the transmitter 1620 may retransmit the sidelink data using the reserved second radio resource without a procedure of requesting resource allocation for retransmitting the sidelink data to the base station or the scheduling UE.

The number of multiple resource pools, N, allocated by the base station or scheduling UE according to the scheduling request of the transmitter UE may correspond to the sum of the first and second radio resources. That is, the base station or the scheduling UE may simultaneously allocate, as multiple resource pools, i) one radio resource allocated for initially transmitting sidelink data and ii) N−1 radio resources reserved for retransmission up to N−1 times when the initially transmitted sidelink data are not received.

When the transmitter 1620 requests the allocation of a resource pool required for unicast/groupcast transmission to the base station or the scheduling UE, the base station or the scheduling UE may allocate N resource pools at one time based on the number of retransmissions. Through this, when receiver UEs have transmitted HARQ NACK feedback to the transmitter UE, a procedure of allocating a resource pool again may be omitted.

In one embodiment, the base station or the scheduling UE may flexibly adjust the number of multiple resource pools, N, taking into account channel situations of the receiver UEs. The base station or the scheduling UE may set the number of resource pools based on the number of retransmissions suitable for a communication link from the transmitter UE to at least one receiver UE based on channel situation information. In this case, one more than the number of retransmissions may be set as the N.

The channel information may include a wideband channel quality indicator (CQI), a subband CQI, a precoding matrix indicator (PMI), a Rank Indicator (RI), or the like. In this case, a representative value representing the CQI may be a modulation coding scheme (MCS). That is, the number of retransmissions may be mapped according to the MCS fed back from a UE.

In one embodiment, when a base station transmits multiple resource pool allocation information, the base station may transmit it to all V2X UEs having established a communication link over a PDCCH. Unlike this, when a scheduling UE transmits multiple resource pool allocation information, the scheduling UE may transmit it to a transmitter UE over a sidelink physical channel. In this case, a PSSCH/PSCCH or a new sidelink physical channel may be applicable as the sidelink physical channel.

The transmitter 1620 may transmit the sidelink data using the first radio resource information. The transmitter 1620 may perform initial transmission of the sidelink data using the allocated first radio resource information. In one embodiment, to do this, the first radio resource information and the second radio resource information may be transmitted to a receiver UE by being included in identical sidelink control information (SCI).

The receiver UE may monitor sidelink data over a first radio resource indicated by the control information. The receiver UE may transmit HARQ ACK/NACK feedback information to the receiver 1630 over a PSFCH according to whether the sidelink data are received.

When retransmission is triggered according to the reception of the HARQ ACK/NACK feedback information for the sidelink data, the transmitter 1620 may retransmit the sidelink data using the second radio resource information. When HARQ NACK feedback information is received for the transmitted sidelink data, the transmitter 1620 may perform the retransmission of sidelink data identical to the transmitted sidelink data. In this case, the transmitter 1620 may immediately retransmit the sidelink data using previously allocated second radio resource. That is, a resource allocation request for the retransmission to the base station or the scheduling UE may not be needed.

According to this, it is possible to provide methods and apparatuses for rapidly retransmitting sidelink data by supporting a resource reservation for a radio resource used for the retransmission of the sidelink data based on HARQ feedback information.

Figure 17:
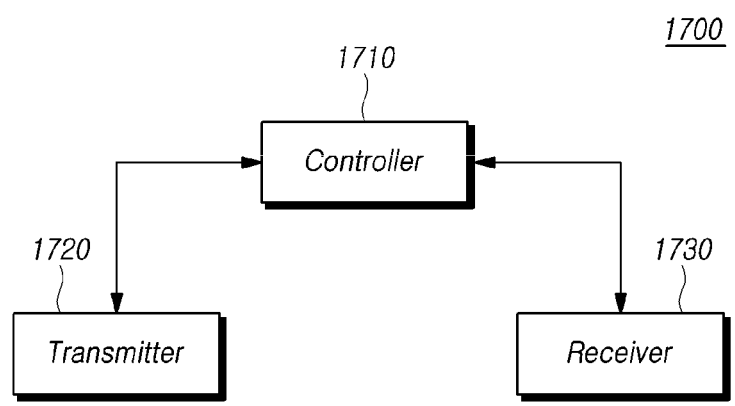
FIG. 17 is a block diagram illustrating a receiver UE in accordance with embodiments of the present disclosure.

FIG. 17 is a block diagram illustrating a receiver UE 1700 according to an embodiment of the present disclosure.

Referring to FIG. 17, the receiver UE 1700 includes a controller 1710, a transmitter 1720, and a receiver 1730.

The controller 1710 controls overall operations of the receiver UE 1700 according to methods of transmitting sidelink HARQ feedback information needed to perform the embodiments of the present disclose described above. The transmitter 1720 is configured to transmit signals, messages, and data needed for performing the embodiments of the present disclosure described above to one or more other UEs.

The receiver 1730 is configured to receive signals, messages, and data needed for performing the embodiments of the present disclosure described above from one or more other UEs.

The receiver 1730 may receive control information including scheduling information a first radio resource used for sidelink data transmission and a second radio resource reserved for sidelink data retransmission from a transmitter UE. In one embodiment, in order for the transmitter UE to transmit sidelink data, the transmitter UE may request allocation information on a radio resource to be used when transmitting sidelink data. The transmitter UE may transmit a radio resource allocation request message for requesting the allocation of a radio resource to a base station or a scheduling UE according to a sidelink transmission mode.

In one embodiment, when transmitting the resource request to the base station, the transmitter UE may transmit the resource request over a typical PUCCH. On the other hand, when transmitting the resource request to the scheduling UE, the transmitter UE may transmit the resource request over a PSSCH or PSFCH, which is a sidelink channel, or a new sidelink physical channel.

The transmitter UE may receive first radio resource information used for the sidelink data transmission and second radio resource information used for sidelink data retransmission. According to the scheduling request of the transmitter UE, the base station or the scheduling UE may allocate a radio resource to be used for transmitting sidelink data. In this case, in one embodiment, the radio resource may be allocated with 'N' multiple resource pools based on the number of retransmissions of the sidelink data. That is, when a radio resource for the transmission of sidelink data is allocated, a resource reservation for a radio resource for retransmission of the sidelink data may be performed.

The first radio resource may be a resource pool allocated for initially transmitting sidelink data, and the second radio resource may be a resource pool reserved for retransmitting the sidelink data. When the sidelink data are not successfully transmitted, the transmitter UE may retransmit the sidelink data using the reserved second radio resource without a procedure of requesting resource allocation for retransmitting the sidelink data to the base station or the scheduling UE.

The number of multiple resource pools, N, allocated by the base station or scheduling UE according to the scheduling request of the transmitter UE may correspond to the sum of the first and second radio resources. That is, the base station or the scheduling UE may simultaneously allocate, as multiple resource pools, i) one radio resource allocated for initially transmitting sidelink data and ii) N−1 radio resources reserved for retransmission up to N−1 times when the initially transmitted sidelink data are not received.

When the transmitter UE requests the allocation of a resource pool required for unicast/groupcast transmission to the base station or the scheduling UE, the base station or the scheduling UE may allocate N resource pools at one time based on the number of retransmissions. Through this, when receiver UEs have transmitted HARQ NACK feedback to the transmitter UE, a procedure of allocating a resource pool again may be omitted.

In one embodiment, the base station or the scheduling UE may flexibly adjust the number of multiple resource pools, N, based on channel situations of the receiver UEs. The base station or the scheduling UE may set the number of resource pools based on the number of retransmissions suitable for a communication link from the transmitter UE to at least one receiver UE based on channel situation information. In this case, one more than the number of retransmissions may be set as the N.

The channel information may include a wideband channel quality indicator (CQI), a subband CQI, a precoding matrix indicator (PMI), a Rank Indicator (RI), or the like. In this case, a representative value representing the CQI may be a modulation coding scheme (MCS). That is, the number of retransmissions may be mapped according to the MCS fed back from a UE.

In one embodiment, when a base station transmits multiple resource pool allocation information, the base station may transmit it to all V2X UEs having established a communication link over a PDCCH. Unlike this, when a scheduling UE transmits multiple resource pool allocation information, the scheduling UE may transmit it to a transmitter UE over a sidelink physical channel. In this case, a PSSCH/PSCCH or a new sidelink physical channel may be applicable as the sidelink physical channel.

The receiver 1730 may receive the first radio resource information and the second radio resource information, which are included in identical sidelink control information (SCI).

The controller 1710 may monitor sidelink data over a first radio resource indicated by the control information. The transmitter 1720 may transmit HARQ ACK/NACK feedback information to the transmitter UE over a PSFCH according to whether the sidelink data are received. When the sidelink data are not successfully received, the transmitter 1720 may transmit HARQ NACK feedback information to the transmitter UE.

The receiver 1730 may receive the sidelink data that the transmitter UE has retransmitted by the HARQ feedback information over the second radio resource indicated by the control information. When retransmission is triggered according to the reception of the HARQ ACK/NACK feedback information for the sidelink data, the transmitter UE may retransmit the sidelink data using the second radio resource information. When the HARQ NACK feedback information is received for the transmitted sidelink data, the transmitter UE may perform the retransmission using a second radio resource that has been allocated previously for the identical sidelink data.

The controller 1710 may monitor the second radio resource indicated by control information that is received previously. Thereafter, the transmitter 1720 may transmit HARQ ACK/NACK feedback information to the transmitter UE according to whether the sidelink data are received. If the sidelink data are not still successfully received, the transmitter may transmit the HARQ ACK/NACK feedback information again to the transmitter UE.

Accordingly, it is possible to rapidly retransmit sidelink data by supporting a resource reservation for a radio resource used for the retransmission of the sidelink data based on HARQ feedback information in accordance with at least one embodiment of the present disclosure.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents set forth above.

The above-described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above-described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the present disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the present disclosure shall be construed on the basis of the accompanying claims in such a manner that all of the technical ideas included within the scope equivalent to the claims belong to the present disclosure.

What is claimed is:

1. A method for performing a sidelink data transmission, carried out by a transmitter user equipment (UE), the method comprising:
   transmitting a radio resource allocation request message for requesting an allocation of a radio resource used for the sidelink data transmission;
   receiving first radio resource information for the sidelink data transmission and second radio resource information for a sidelink data retransmission;
   performing the sidelink data transmission based on the first radio resource information; and
   performing the sidelink data retransmission based on the second radio resource information upon a triggering of retransmission, which associates with a reception of hybrid automatic repeat request (HARQ) feedback information for sidelink data,
   wherein a first radio resource allocated by the first radio resource information is a resource pool for an initial transmission of the sidelink data, and a second radio resource allocated by the second radio resource information is a resource pool for retransmitting the sidelink data, wherein the first radio resource and the second radio resource included in N resource pools correspond to the initial transmission and N−1 retransmissions, respectively, where N is an integer number equal to or greater than 1.

2. The method according to claim 1, wherein the first radio resource information and the second radio resource information are received through sidelink control information (SCI).

3. The method according to claim 1, wherein the number of second radio resources included in the second radio resource information is set based on channel information for transmission of the sidelink data.

4. The method according to claim 3, wherein the channel information includes at least one of a wideband channel quality indicator (CQI), a subband CQI, a precoding matrix indicator (PMI), a Rank Indicator (RI), or a modulation coding scheme (MCS).

5. A method for monitoring a sidelink data transmission, carried out by a receiver user equipment (UE), the method comprising:

receiving first radio resource information for the sidelink data transmission and second radio resource information for a sidelink data retransmission from a transmitter UE;

monitoring the sidelink data transmission over a first radio resource;

transmitting hybrid automatic repeat request (HARQ) feedback information to the transmitter UE based on that the sidelink data is not received; and monitoring the sidelink data retransmission that the transmitter UE has retransmitted over a second radio resource according to the HARQ feedback information, wherein the first radio resource allocated by the first radio resource information is a resource pool for an initial transmission of sidelink data, and the second radio resource included in the second radio resource information is a resource pool for retransmitting the sidelink data, wherein the first radio resource and the second radio resource included in N resource pools correspond to the initial transmission and N−1 retransmissions, respectively, where N is an integer number equal to or greater than 1.

6. The method according to claim 5, wherein the first radio resource information and the second radio resource information are received through sidelink control information (SCI).

7. The method according to claim 5, wherein the number of second radio resources is set based on channel information for reception of the sidelink data.

8. The method according to claim 7, wherein the channel information includes at least one of a wideband channel quality indicator (CQI), a subband CQI, a precoding matrix indicator (PMI), a Rank Indicator (RI), or a modulation coding scheme (MCS).

9. A transmitter user equipment (UE) for performing a sidelink data transmission, the transmitter UE comprising:

a transmitter that transmitting a radio resource allocation request message for requesting allocation of a radio resource used for the sidelink data transmission; and a receiver that receiving first radio resource information for the sidelink data transmission and second radio resource information for a sidelink data retransmission, wherein the transmitter performs the sidelink data transmission based on the first radio resource information, and upon a triggering of retransmission, which associates with a reception of hybrid automatic repeat request (HARQ) feedback information for sidelink data, the transmitter further performs the sidelink data retransmission based on the second radio resource information, wherein a first radio resource allocated by the first radio resource information is a resource pool for an initial transmission of the sidelink data, and a second radio resource allocated by the second radio resource information is a resource pool for retransmitting the sidelink data, wherein the first radio resource and the second radio resource included in N resource pools correspond to the initial transmission and N−1 retransmissions, respectively, where N is an integer number equal to or greater than 1.

10. The transmitter UE according to claim 9, wherein the first radio resource information and the second radio resource information are received through sidelink control information (SCI).

11. The transmitter UE according to claim 9, wherein the number of second radio resources included in the second radio resource information is set based on channel information for transmission of the sidelink data.

12. The transmitter UE according to claim 11, wherein the channel information includes at least one of a wideband channel quality indicator (CQI), a subband CQI, a matrix indicator (PMI), a Rank Indicator (RI), or a modulation coding scheme (MCS).

* * * * *